United States Patent
Watanabe et al.

(10) Patent No.: US 11,016,239 B1
(45) Date of Patent: May 25, 2021

(54) LIGHTING DEVICE AND DISPLAY DEVICE

(71) Applicant: SHARP KABUSHIKI KAISHA, Sakai (JP)

(72) Inventors: Hisashi Watanabe, Sakai (JP); Hirotoshi Yasunaga, Sakai (JP); Youzou Kyoukane, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 125 days.

(21) Appl. No.: 16/487,212

(22) PCT Filed: Feb. 15, 2018

(86) PCT No.: PCT/JP2018/005187
§ 371 (c)(1),
(2) Date: Aug. 20, 2019

(87) PCT Pub. No.: WO2018/155294
PCT Pub. Date: Aug. 30, 2018

(30) Foreign Application Priority Data

Feb. 22, 2017 (JP) .............................. JP2017-031241

(51) Int. Cl.
F21V 8/00 (2006.01)
(52) U.S. Cl.
CPC ......... *G02B 6/0076* (2013.01); *G02B 6/0028* (2013.01); *G02B 6/0073* (2013.01)

(58) Field of Classification Search
CPC ... G02B 6/0076; G02B 6/0028; G02B 6/0073
See application file for complete search history.

(56) References Cited

U.S. PATENT DOCUMENTS

| | | | |
|---|---|---|---|
| 2011/0080539 A1* | 4/2011 | Shimizu | G02B 6/0028 349/62 |
| 2012/0075326 A1 | 3/2012 | Tsuchiya et al. | |
| 2016/0320550 A1* | 11/2016 | Tsai | G02B 6/0091 |

FOREIGN PATENT DOCUMENTS

JP 2012-069461 A 4/2012

* cited by examiner

*Primary Examiner* — Donald L Raleigh
(74) *Attorney, Agent, or Firm* — ScienBiziP, P.C.

(57) ABSTRACT

A lighting device includes light guide plates each of which includes a light exit section including a light it surface and a light entering section extending from the light exit section toward a light source row and including an extended end surface as a light entering surface. The light exit section has a thickness dimension that is smaller than that of the light entering section at an extended end thereof. The light guide plates are stacked on each other such that the light exit sections thereof overlap each other seen from a normal direction of the light exit surface. The light entering section of one light guide plate and the light entering section of another light guide plate are disposed next to each other in an arrangement direction of the light sources so as not to overlap each other seen from the normal direction of light exit surface.

12 Claims, 14 Drawing Sheets

LIGHTING DEVICE AND DISPLAY DEVICE

TECHNICAL FIELD

The technology described in this specification relates to a lighting device and a display device.

BACKGROUND ART

Recently, mobile terminal devices and television devices have been strongly demanded to be thinner. A liquid crystal display device including a liquid crystal panel has been widely used as such an image display device. The liquid crystal panel requires a backlight unit as a separately provided lighting device because the liquid crystal panel does not emit light itself. The backlight unit is generally classified into either a direct type or an edge-light type according to arrangement of a light source. The light source is arranged directly below a display surface of the liquid crystal panel in the direct type and the light source is arranged on an edge side of the liquid crystal panel. An edge-light type backlight unit is preferably used to achieve further reduction in thickness of the liquid crystal display device.

Furthermore, high contrast of display images and low power consumption have been demanded. The technology of local dimming for adjusting brightness of a light exit surface of the backlight unit for every region has been proposed.

An example of an edge-light type backlight unit in which the local dimming is achieved is described in Patent Document 1.

RELATED ART DOCUMENT

Patent Document

Patent Document 1: Japanese Unexamined Patent Application Publication No. 2012-69461

Patent Document 1 discloses a backlight device that includes light guide plates and a point light source group including point light sources. The light guide plates overlap each other with a same light output direction and each of the light guide plates includes stripe-shaped projections. The point light source group that includes the point light sources that emit light in an extending direction of the stripe-shaped projections. The point light source group is disposed for each of the light guide plates. The backlight device controls lighting of the point light sources by a unit of each point light source group according to lighting signal from an external device. The lighting of the point light source groups is controlled such that light travels in a belt-like form and a light exit pattern is disposed for each of them to allow the light to partially exit the light guide plate, and accordingly, so-called two-dimensional local diming is achieved.

Problem to be Solved by the Invention

However, in the above structure, a thickness dimension of the backlight device is increased by stacking the light guide plates. The point light source groups corresponding to the respective light guide plates are necessary and this may complicate a wiring structure.

DISCLOSURE OF THE PRESENT INVENTION

The technology described herein was made in view of the above circumstances. An object of the technology described herein is to provide a thin lighting device that can adjust exiting of light through a light exit surface for every region and a display device including such a lighting device.

Means for Solving the Problem

A lighting device disclosed in the specification includes a following configuration.

(1) The lighting device includes a light source row including light sources that are arrayed, a lighting circuit connected to the light sources and configured to control lighting of the light sources by a unit of a light source group that includes at least one of the light sources, and light guide plates that light from the light sources enters and the light exits as planar light, each of the light guide plates being formed in a plate shape and having one plate surface and another plate surface. Each of the light guide plates includes a light exit section including the one plate surface as a light exit surface through which the light exits, and a light entering section extending from a first edge surface of peripheral edge surfaces of the light exit section toward the light source row and including an extended end surface as a light entering surface through which the light from the light source enters. The light exit section has a thickness dimension that is smaller than a thickness dimension of the light entering section at an extended end thereof. The light guide plates includes at least two light guide plates that configure a light guide plate group, and the at least two light guide plates are stacked on each other such that the light exit sections thereof overlap each other seen from a normal direction of the light exit surface and the light exit surfaces thereof face a same direction. In the light guide plate group, the light entering section of one light guide plate and the light entering section of another light guide plate are disposed next to each other in an arrangement direction of the light sources so as not to overlap each other seen from the normal direction of light exit surface.

According to such a configuration, the exiting of light through the light exit surface of the lighting device can be adjusted for every region by controlling the light that enters each of the light guide plates. The light entering sections of the light guide plates are overlapped with each other. Since the light exit section of each light guide plate is relatively thinner than the light entering section thereof, the thickness dimension of the light guide plate group that may be increased by the overlapping of the light exit sections is less likely to be increased. Further, the light entering sections that are relatively thick are not overlapped each other. Therefore, even if the light guide plates are stacked on each other, the thickness dimension of the whole light guide plate group is not increased by the overlapping of the light entering sections. The light entering sections of the light guide plates are aligned alternately in the arrangement direction of the light sources. According to such a configuration, each of the light entering sections is disposed opposite each of the light sources included in the light source row such that the light efficiently enters the light guide plates. Thus, light from one light source row can enter the light guide plates, and therefore, increase of the thickness dimension or complication of wiring structure that may be caused by providing multiple light source rows are less likely to be caused.

(2) In the lighting device disclosed herein, the thickness dimension of the light entering section at the extended end thereof may be substantially equal to a thickness dimension of the light source row.

According to such a configuration, the light from the light source group is allowed to efficiently enter through the light entering surface while increase of the thickness dimension of the lighting device being restricted.

(3) In the lighting device disclosed herein, the light exit surface and the other plate surface of the light exit section may be parallel to each other, the light entering section may have an inclined surface such that the thickness dimension of the light entering section gradually increases from a basal end thereof toward the extended end, and the inclined surface may be inclined at an angle θ with respect to the light exit surface or the other plate surface and the angle θ is smaller than 5 degrees.

The angle of incidence of light with respect to an interface between the light guide plate and air is preferable to be great such that the light that has entered the light guide plate does not exit through the interface. Namely, the angle between the light emitting direction of light that is emitted by the light source and the interface between the light guide plate and the air is preferable to be small as possible.

A range of the angle θ between the inclined surface and the light exit surface for achieving total reflection of the incidence light at the inclined surface will be described below in a configuration including a generally used light guide plate that is made of acrylic resin.

If light travels from a medium M1 having a refractive index n1 to a medium M2 having a refractive index n2, an angle of incidence a and an angle of refraction @ of the light with respect to an interface between the medium M1 and the medium M2 is represented by a following formula.

$$\sin \alpha / \sin \beta = n2/n1 \quad (1)$$

In the formula (1), a critical angle α1 at which all of light rays that travel from the light guide plate made of acrylic resin toward air are reflected (namely, the angle of refraction β is 90 degrees) is obtained as follows. 1.49, which is the refractive index of acrylic resin, is substituted in n1, 1.00, which is the refractive index of atmosphere, is substituted in n2, and sin 90°=1 is substituted in sin β. Accordingly, the formula (1) becomes α1≈42.2°. On the other hand, the angle of refraction β1 of light that has entered the light guide plate at an angle quite close to a tangent line of the light entering surface (namely, the angle of incident α is quite close to 90 degrees) is obtained by substituting 1.00, which is the refractive index of atmosphere, into n1, substituting 1.49, which is the refractive index of acrylic resin, into n2, and substituting sin 90°=1 into sin α. Accordingly, β1≈42.2° is obtained. If the equation of α=(90°−42.2°)−θ>42.2° is satisfied, the light that has entered the light guide plate through the light entering surface is totally reflected by the inclined surface toward the light exit section. Namely, the range of the angle 9 for achieving total reflection of the incidence light at the inclined surface is θ>47.8°−42.2°=5.60.

Other than acrylic resin, polycarbonate resin or various kinds of glasses are generally used as the material of the light guide plate. The refractive index of such material is greater than the refractive index of acrylic resin. Therefore, if the angle θ is limited to the above range, the light is less likely to exit through the inclined surface and the light that has entered the light entering section can travel to the light exit section at high efficiency and to be used.

(4) In the lighting device disclosed herein, the light source row may be mounted on one light source board.

According to such a configuration, only one light source board is disposed for the multiple light guide plates. Therefore, the wiring is easily formed and the structure of the lighting device is simplified. Increase of the thickness dimension of the lighting device that may be caused by providing multiple light source boards is less likely to be caused.

(5) In the lighting device disclosed herein, the light entering surfaces of the light guide plates may be on a same plane surface, and the light source board may be fixed to all of the light guide plates at the light entering sections.

According to such a configuration, the light guide plates are fixed to the light source board with a simple structure. As a result, unnecessary space is less likely to be created between the light source and the light guide plate and the light use efficiency is improved and brightness of the light exit surface is improved.

(6) In the lighting device disclosed herein, each of the light guide plates may include the light entering sections at intervals in the arrangement direction of the light sources, and the light entering sections of the light guide plates may be arranged such that the light entering sections of a same light guide plate are not arranged next to each other seen from the normal direction of the light exit surface.

According to such a configuration, the light entering sections of the light guide plates extend alternately and face the light source row. Therefore, the light from the light source group can enter each of the light guide plates through each of the light entering sections efficiently. Accordingly, the local dimming as described below can be achieved with high contrast. In the local dimming, the light emission by the light source group is controlled to adjust the exiting of light that exits through the light exit surface for every belt-like shaped divided area that extends in the normal direction of the light entering surface.

(7) In the lighting device disclosed herein, the light entering sections of the light guide plates may be arranged such that a distance between the extended ends of the light entering sections that are adjacent to each other is from 0.2 mm to 2.0 mm seen from the normal direction of the light exit surface.

According to such a configuration, when the light guide plates are stacked on each other, the adjacent light entering sections are less likely to be contacted with each other and problems are less likely to be caused.

(8) In the lighting device disclosed herein, the light exit section may be divided into divided areas by an elongated structure that extends in a normal direction of the light entering surface, and at least one of the light entering sections may extend from a portion of the first edge surface corresponding to each of the divided areas and the extended end surface thereof may be the light entering surface through which light from the light source group enters.

According to such a configuration, the elongated structure keeps the light to stay within the belt-like shaped divided area that extends in the normal direction of the light entering surface. Accordingly, the light directivity is increased and optical independency of each divided area is increased. The light that has emitted by the light source disposed in each divided area and entered the light entering section can travel to the light exit section efficiently. Luminance contrast is increased for every divided area of the light exit surface and power consumption becomes less. The elongated structure may be formed with unevenness of prisms or a cylindrical shape.

(9) In the lighting device disclosed herein, the light guide plates at least may include a first light guide plate and a second light guide plate that is disposed on the other plate surface of the first light guide plate. The first light guide plate may include a first uneven pattern on at least one of the light exit surface and the other plate surface thereof, and the first uneven pattern may allow the light that has entered through the light entering surface to exit through the light exit surface. The second light guide plate may include a second uneven pattern on at least one of the light exit surface and the other plate surface thereof, and the second uneven pattern may allow the light that has entered through the light entering surface to exit through the light exit surface. The first uneven pattern and the second uneven pattern may be disposed not to overlap each other seen from the normal direction of the light exit surface.

According to such a configuration, the first uneven pattern or the second uneven pattern is disposed in any position of each of the light guide plates. Accordingly, the light that has travelled within each of the light guide plates changes its travel direction at the position to exit the light guide plate and the exiting of light through the light exit surface can be adjusted for every area with respect to the normal direction of the light entering surface. The exiting of light is adjusted for every belt-shaped divided area by controlling lighting of the light source group and the two-dimensional local dimming can be achieved as well. The first uneven pattern and the second uneven pattern are arranged so as not to overlap each other such that the luminance contrast of the light exit surface is increased for every area corresponding to the pattern. The first uneven pattern and the second uneven pattern include lens projections, prisms, or embosses. The first uneven pattern and the second uneven pattern may have the same shape or may have different shapes.

(10) In the lighting device disclosed herein, the second uneven pattern may be relatively closer to the light entering section than the first uneven pattern is.

The second light guide plate is disposed farther away from the display panel than the first light guide plate is. The display panel is disposed on the light exit surface side with respect to the light guide plate group. Therefore, the light is likely to be dispersed within the second light guide plate before reaching the display panel. Therefore, according to the configuration including the second uneven pattern on the light entering section side, compared to a configuration including the first uneven pattern closer to the light entering section, there is less occurrence of unevenness in the exiting of light (spot unevenness) in a portion near the light entering section. Such unevenness may be caused if the light from the light source does not sufficiently reach the portion.

(11) In the lighting device disclosed herein, the first light guide plate and the second light guide plate may be formed in a same shape and may be disposed in an inverted arrangement such that a plate surface of the first light guide plate corresponding to the light exit surface becomes the other plate surface of the second light guide plate.

According to such a configuration, a cost for manufacturing the light guide plates is reduced and management of parts becomes easy. A lighting device that includes two light guide plates may be configured as described above, if the first light guide plate and the second light guide plate include the same number of light entering sections of the same dimension and include the same number of uneven patterns that have the same dimension and are disposed alternately, and one of the first uneven pattern and the second uneven pattern is disposed on the light exit surface and another one is disposed on the other surface.

(12) The lighting device disclosed herein may further include another light source row that includes light sources arranged along another edge section that is opposite from one edge section along which the light sources are arranged, the other light source row and the light source row sandwiching the light guide plates therebetween. Each of the light guide plates may include another light entering section, and the other light entering section may extend from a second edge surface of the peripheral edge surfaces of the light exit section toward the other light source row and includes an extended end surface thereof as a light entering surface through which the light from the other light source row enters, and the second edge surface may be opposite from the first edge surface. One of the first uneven pattern and the second uneven pattern may include first uneven patterns or second uneven patterns and one of the first uneven patterns or the second uneven patterns may be disposed at intervals in the normal direction of the light entering surface.

According to such a configuration, in the configuration that can increase a size of the light exit surface and increase luminance, the light that has not exited through a target region and travelled within the light guide plate is less likely to be directed by the adjacent uneven pattern. Accordingly, high luminance contrast of the light exit surface can be maintained and quality of display images can be increased.

The present specification discloses a display device as described below.

(13) The display device includes the lighting device according to any one of the above (1) to (12), and a display panel displaying images using light from the lighting device.

According to such a configuration, the thin display device that can display an image with low power consumption and high contrast is provided. A liquid crystal display device that includes a liquid crystal panel is used as the display panel can be used various usages of mobile terminal devices such as a smartphone or a tablet device, and a display of a television device or a personal computer, and is particularly effectively used for devices that are demanded to be very thin.

Advantageous Effect of the Invention

According to the technology described herein, a thin lighting device that can adjust exiting of light through a light exit surface for every region and a display device including such a lighting device are provided.

MODES FOR CARRYING OUT THE INVENTION

First Embodiment

A first embodiment will be described with reference to FIGS. 1 to 6.

Figure 1:
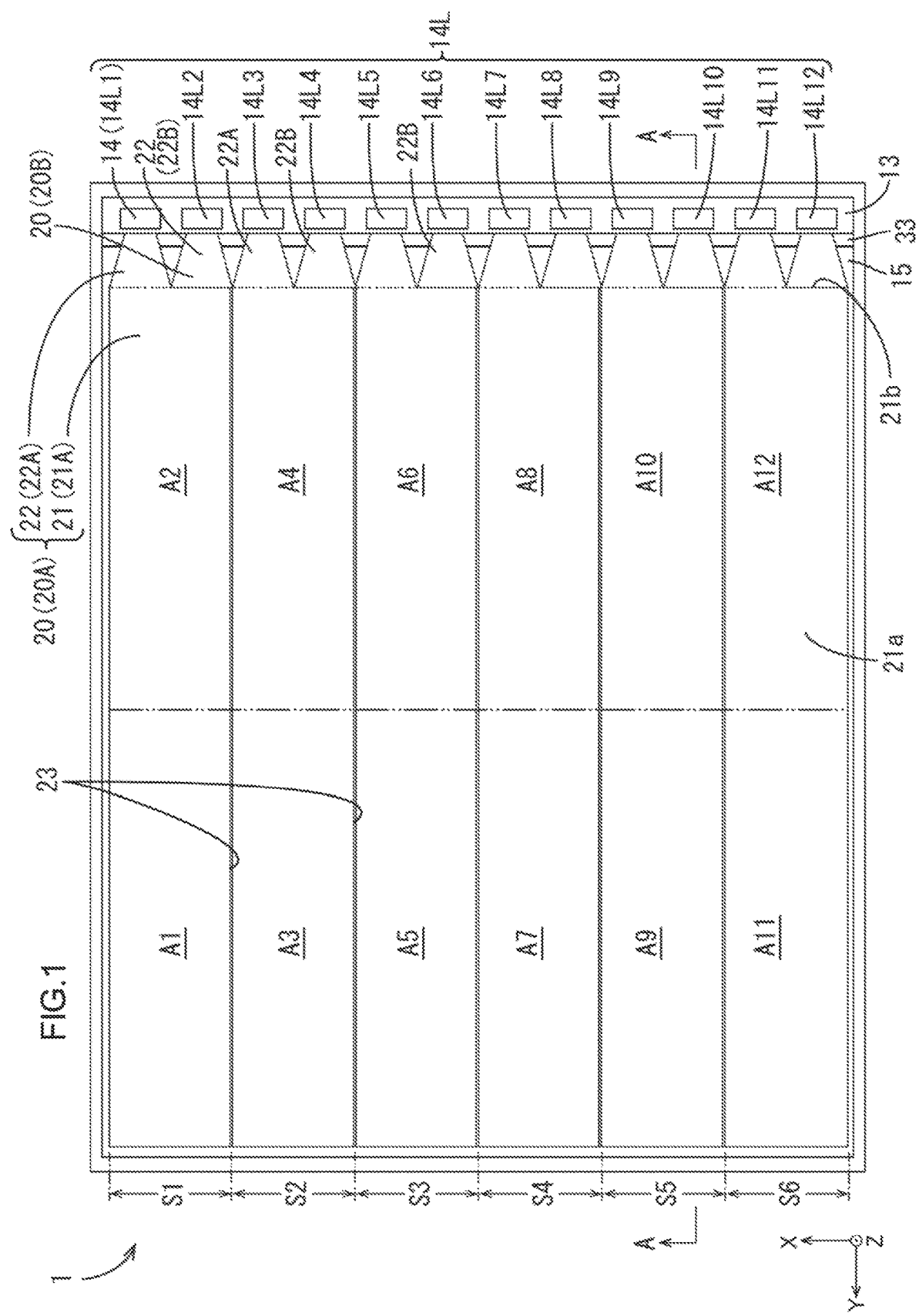
FIG. 1 is a partially-exploded perspective view illustrating a schematic configuration of a lighting device according to a first embodiment.
Figure 2:
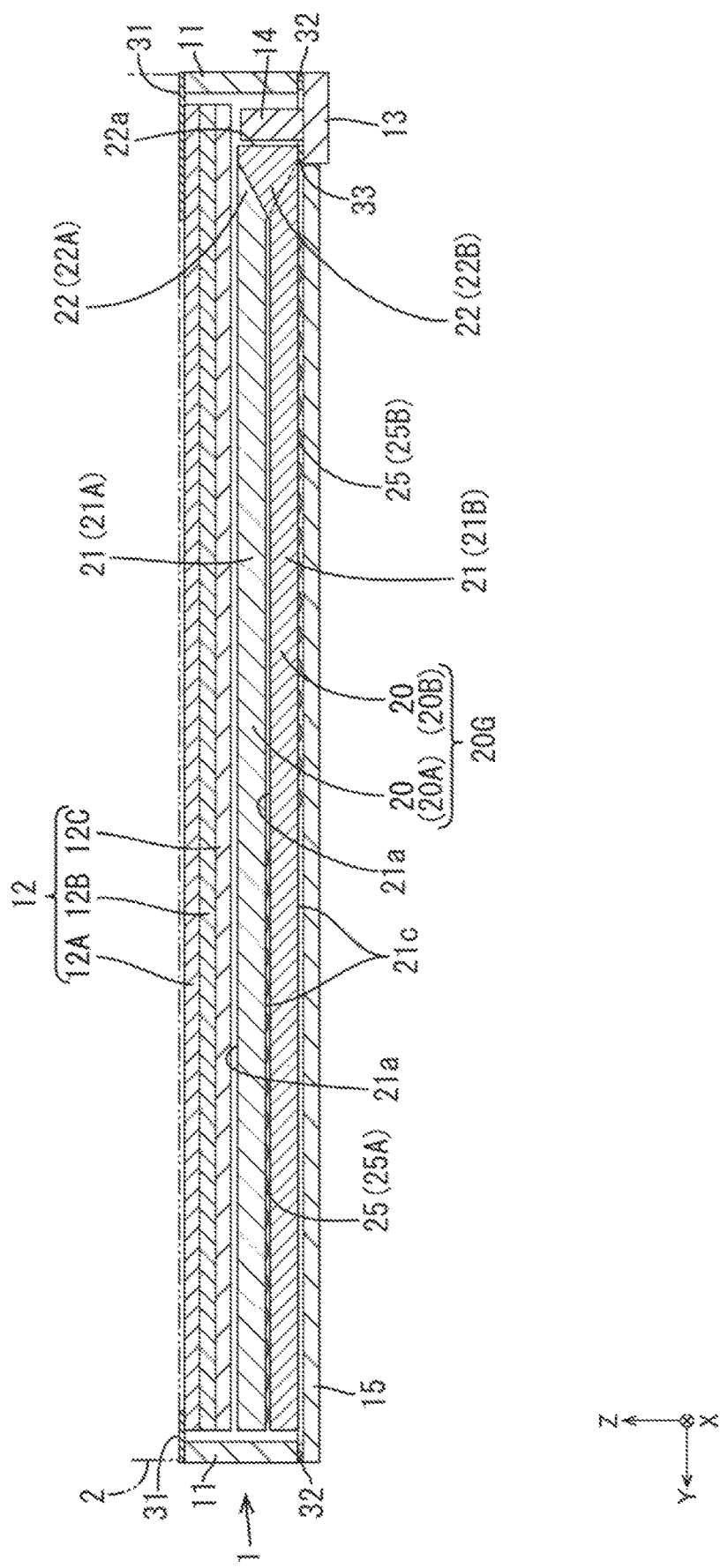
FIG. 2 is a cross-sectional view illustrating a cross-sectional configuration of the lighting device according to the first embodiment taken along line A-A in FIG. 1.
Figure 4:
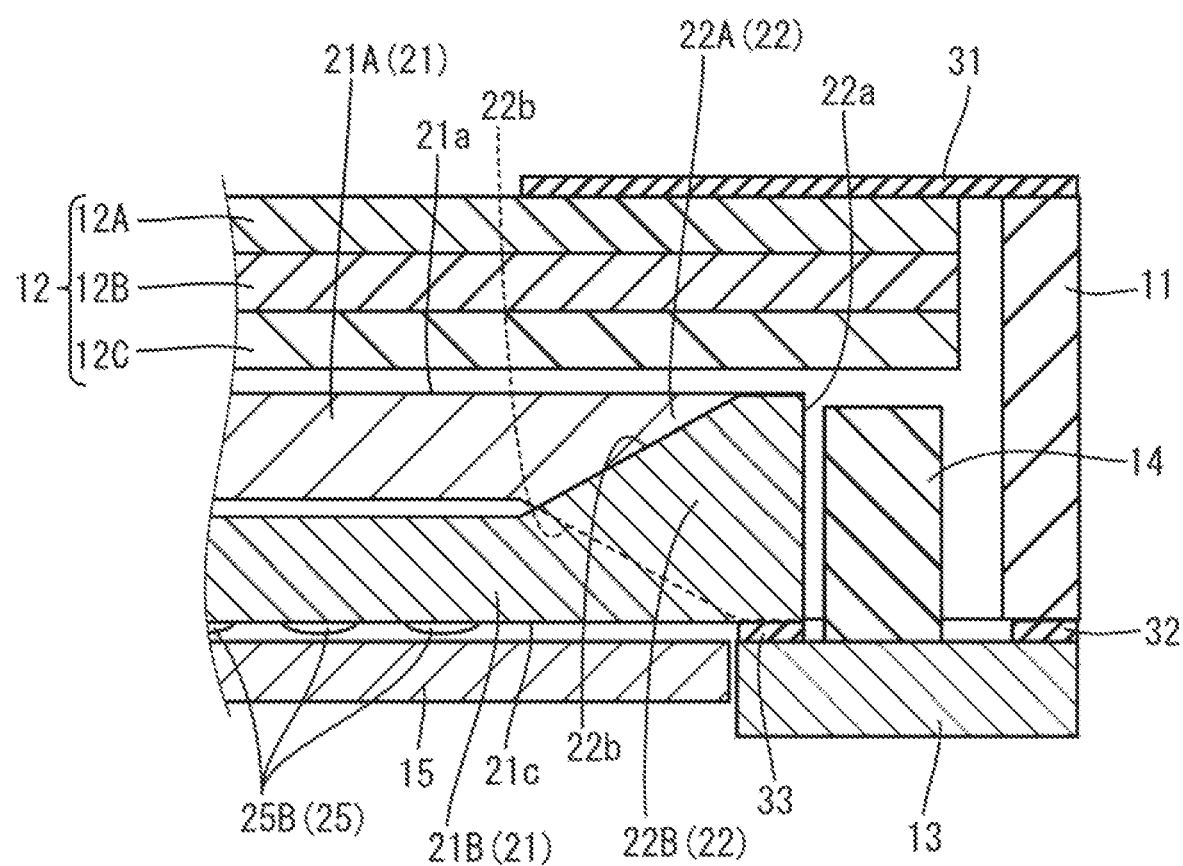
FIG. 4 is an enlarged cross-sectional view of a portion of FIG. 2 and illustrating an edge section where the LEDs are arranged.

In this embodiment section, a backlight unit (a lighting device) 1 will be described as an example. X-axis, Y-axis and Z-axis may be present in the drawings and each of the axial directions represents a direction represented in each drawing. A right side in FIGS. 1, 2, 4 and 6 is referred to as a right side, an upper side in FIGS. 2 and 4 is referred to as a front-surface side (a lower side in the drawings is referred to as a back-surface side), and an upper side in FIG. 1 is referred to as a rear side (a lower side is referred to as a front side). A symbol is put on one of the same components and others may not be provided with any symbols.

The backlight unit 1 according to the present embodiment is configured to be disposed behind a liquid crystal panel (a display panel) 2 that has quadrangular plan-view shape illustrated with a two-dot chain line. The liquid crystal panel 2 that has a configuration as follows can be used although details of the liquid crystal panel 2 will not be described. The liquid crystal panel 2 includes a pair of glass substrates that are bonded to each other while having a predetermined gap therebetween and includes liquid crystals that are enclosed in a space between the glass substrates. On one of the pair of substrates, switching components (such as TFTs) that are connected to source lines and gate lines that are perpendicular to each other, pixel electrodes that are connected to the switching components, and an alignment film are arranged. On another one of the glass substrates, a color filter, a counter electrode, and an alignment film are arranged. The color filter includes color portions of red (R), green (G), blue (B) that are arranged at certain arrangement. Polarizing plates are disposed on outer surfaces of the substrates. The liquid crystal panel 2 is arranged such that a normal line direction to a plate surface thereof matches the Z-axis direction.

A general configuration of the backlight unit 1 will be described.

As illustrated in FIG. 1, the backlight unit 1 has a substantially quadrangular plan-view shape and is a so-called edge-light type (a side-light type) backlight unit. A light source row 14L is arranged along one side edge portion of a light guide plate group 20G that is disposed within the backlight unit 1.

As illustrated in FIGS. 1 and 2, the backlight unit 1 includes a frame 11 that has a thin quadrangular shape. The frame 11 opens on both sides with respect to the Z-axis direction (a front-surface side and a back-surface side) and are arranged such that a long side direction thereof matches the Y-axis direction and a short side direction thereof matches the X-axis direction. The frame 11 is a component for collectively fixing the components that will be described later and may be molded from polycarbonate resin. In the present embodiment, a white frame is used; however, a black frame may be used to prevent light from leaking outside.

As illustrated in FIG. 2, an optical member 12, which has a quadrangular plan-view shape, is disposed in the frame 11 close to the front-surface side. FIG. 1 is a plan view of the backlight unit 1 without including the optical member 12. The optical member 12 covers a hole of the frame 11 on the front surface side thereof (on a liquid crystal panel 2 side) and is disposed between the liquid crystal panel 2 and the light guide plate group 20G, which will be described later. The optical member 12 is obtained by selecting a diffuser sheet, a prism sheet, and a polarizing reflection sheet (for example, "DBEF" produced by 3M) as appropriate and stacking the sheets. In this embodiment section, the optical member 12 includes three sheets of a prism sheet 12A, a prism sheet 12B, and a diffuser sheet 12C that are stacked on each other in this order from the front-surface side (the liquid crystal panel 2 side). As illustrated in FIG. 2, a back surface of a double-sided adhesive tape 31 is attached to a front surface of the prism sheet 12A that is disposed closest to the front surface out of the optical member 12 such that the optical member 12 is connected to the right and left short-side sections of the frame via the double sided adhesive tape 31. The liquid crystal panel 2 is put on the front surface of the double sided adhesive tape 31 such that the components are fixed to each other.

Figure 3:
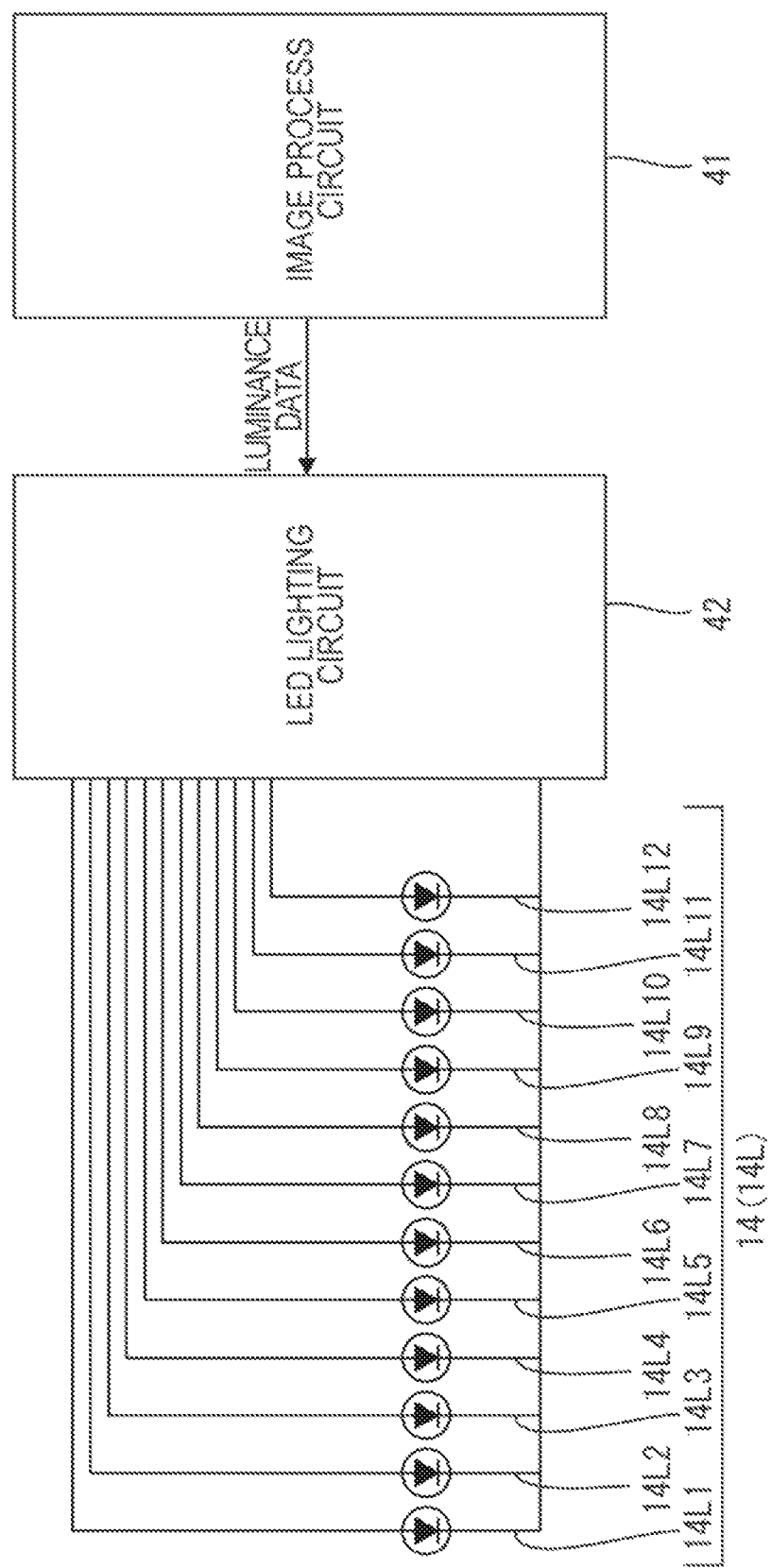
FIG. 3 is a block diagram schematically illustrating connection of LEDs and a lighting circuit.

As illustrated in FIGS. 1 and 2, an LED board (a light source board) 13 is disposed in a position along a right side short section of the frame 11. The LEDs 14 of a side-surface light emitting type, which will be described later, are used in this embodiment. Therefore, the LED board 13 has an elongated plate shape that extends in the X-axis direction and is arranged such that a normal line direction to the main plate surface thereof matches the Z-axis direction or is parallel to the plate surfaces of the liquid crystal panel 2 or the optical member 12. A substrate of the LED board 13 is made of synthetic resin that has insulation properties and flexibility. Wiring (not illustrated) that is a portion of a metal film made of a copper foil is disposed on the surface of the substrate so as to connect the LEDs 14 and a lighting circuit that are mounted on the LED board 13. In this embodiment, the wiring is disposed such that all of the LEDs 14 arrayed on the LED board 13 are connected to each other in parallel. As illustrated in FIG. 3, light emission intensity can be controlled for every LED 14 according to luminance data that is sent from an external image process circuit 41 to the lighting circuit 42. As illustrated in FIGS. 2 and 4, the LED board 13 is fixed to the back side surface of the right side short frame section of the frame 11 with the double-sided adhesive tape 32 that is attached to the right side edge of the LED board 13 and is fixed to light guide plates 20A, 20B, which will be described later, with the double sided adhesive tape 33 that is attached to the left side edge of the LED board 13.

As illustrated in FIG. 1 and other drawings, the light emitting diodes (LEDs, a light source) 14 (twelve LEDs in this embodiment) are mounted on the surface of the LED board 13 to be arrayed along the elongated direction thereof and form a light source row 14L. The light source row 14L is arranged inside the frame 11 such that the LEDs 14 are arrayed along the right short frame section of the frame 11. In this embodiment, one side surface of the LED 14 that is adjacent to amounting surface thereof to be mounted on the LED board 13 is a light emission surface and a so-called side surface-emitting type LED is used for the LED 14. Each of the LEDs 14 is arranged such that an optical axis thereof substantially matches the Y-axis direction. From a view point of reducing a thickness of the backlight unit 1, the side surface-emitting type LED is preferably used for the LED 14 rather than a so-called top surface-emitting type LED in which a surface opposite from the mounting surface to be mounted on the LED board 13 is a light emission surface. An LED that emits white light and an LED that emits RGB lights may be used in combination for the LED 14. In this embodiment, only white LEDs, which are generally used, are used.

As illustrated in FIGS. 1 and 2, a light guide plate group 20G that includes two light guide plates is disposed inside the frame 11 and light from the LEDs 14 travel within the light guide plate group 20G toward the optical member 12 and finally to the liquid crystal panel 2. As illustrated in FIG. 1, the light guide plate group 20G is disposed between the light source row 14L, which is arranged at the right edge section inside the frame 11, and the left short frame section of the frame 11. As illustrated in FIG. 2, the light guide plate group 20G is disposed between the optical member 12 and a reflection sheet 15 with respect to the Z-axis direction. Accordingly, the arrangement direction in which the LEDs 14 (the LED board 13) and the light guide plate group 20G are arranged matches the Y-axis direction and the arrangement direction in which the optical member 12 (the liquid crystal panel 2) and the light guide plate group 20G are arranged matches the Z-axis direction. Thus, the arrangement directions are perpendicular to each other. The light emitted by the LEDs 14 in the Y-axis direction enters the light guide plate group 20G and travels within the light guide plate group 20G to be directed toward the front surface side (toward the optical member 12) in the Z-axis direction and exits the light guide plate group 20G. Details of the light guide plate group 20G will be described later.

As illustrated in FIGS. 1 and 2, the reflection sheet 15 is disposed on the back surface side of the light guide plate group 20G. The reflection sheet 15 has a quadrangular plan view shape and is disposed to cover the back-side hole of the frame 11. The reflection sheet 15 is disposed to cover an entire area of a light exit section 21, which will be described later, on the back surface side of the light guide plate group 20G. The reflection sheet 15 reflects light that exits the light guide plate group 20G through the back surface thereof toward the front surface side and allows the reflected light to exit through a light exit surface 21a. A generally used white sheet or a mirror surface sheet may be used as the reflection sheet 15. "LUMIRROR (registered trademark)" manufactured by TORAY INDUSTRIES, INC. may be used as a white sheet and "ESR" manufactured by 3M may be used as a mirror surface sheet.

Next, the light guide plate group 20G will be described in detail.

The light guide plate group 20G of this embodiment includes an upper light guide plate (a first light guide plate) 20A that is disposed on a relatively front surface side and a lower light guide plate (a second light guide plate) 20B that is disposed on a relatively back surface side. Hereinafter, a suffix A or B is added after the symbol such as the upper light guide plate 20A or the lower light guide plate 20B to describe each of the light guide plates 20 separately and no suffix is added to generally describe a light guide plate. A suffix A or B is added after the symbol to describe a configuration of each of the light guide plates 20 separately and no suffix is added to generally describe a configuration of a light guide plate.

The light guide plate 20 may be made of material having the refractive index sufficiently higher than that of air and high transmissivity, and may be made of resin such as transparent acrylic or polycarbonate or various kinds of glass. In this embodiment, two acrylic resin plates are used for the upper light guide plate 20A and the lower light guide plate 20B.

Figure 5:
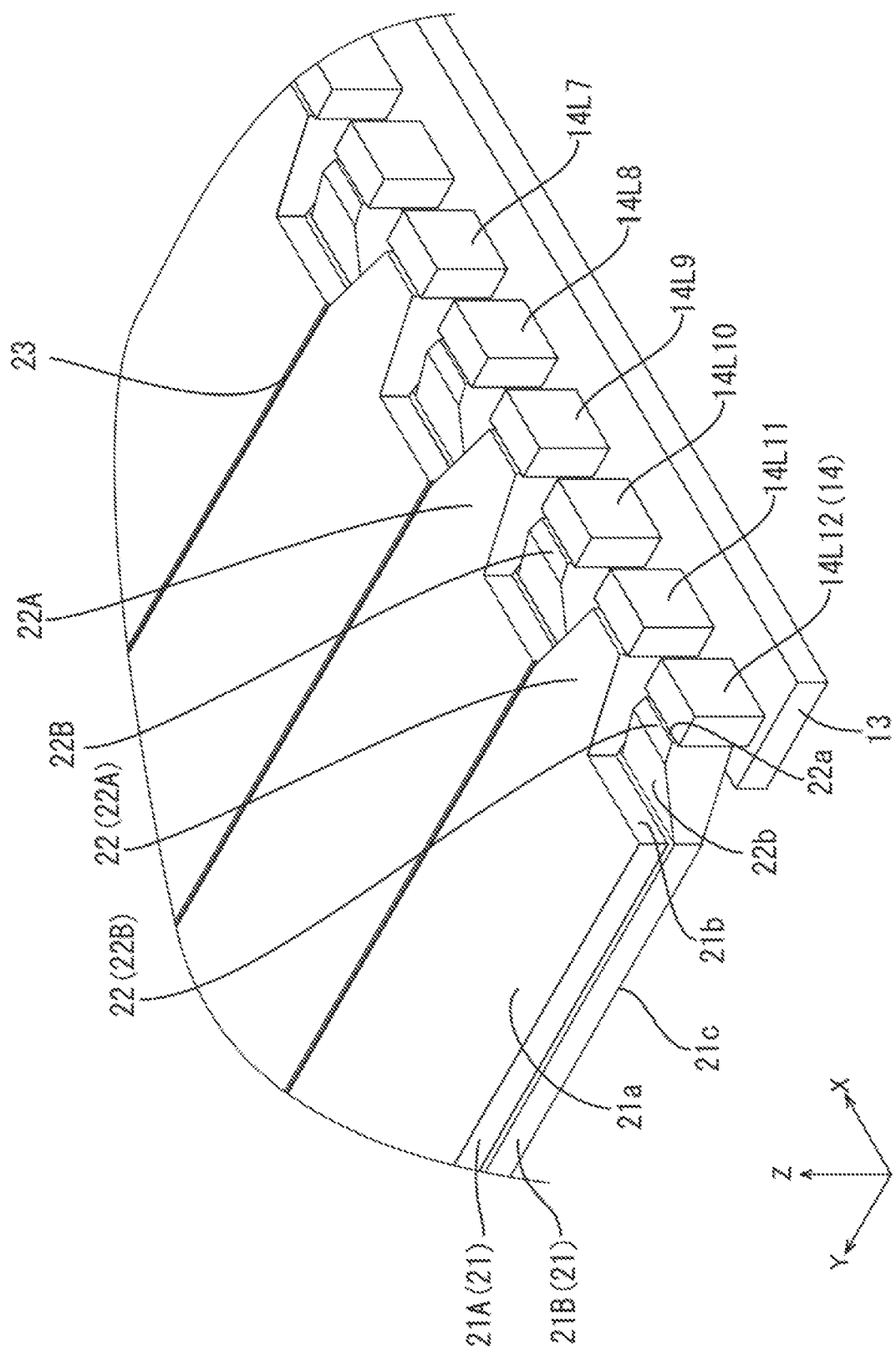
FIG. 5 is a perspective view schematically illustrating arrangement of a light entering section of each light guide plate and LEDs.

As illustrated in FIG. 1 and other drawings, the light guide plate 20 includes the light exit section 21 that has a substantially quadrangular plan view plate shape and light entering sections 22 that extend rightward from the light exit section 21. As illustrated in FIG. 2 and other drawings, the light guide plate 20 is disposed such that a plate surface of the light exit section 21 is parallel to the optical member 12 (the liquid crystal panel 2) and the reflection sheet 15. As illustrated in FIG. 1, FIG. 5, and other drawings, the light entering section 22 extends from a first edge surface 21b of the light exit section 21 in the Y-axis direction toward the right side light source row 14L such that an extended edge surface of the light entering section 22 faces each LED 14. The first edge surface 21b is a right edge surface of the peripheral edge surfaces of the light exit section 21 and is parallel to the X-axis. Each of the light guide plates 20 includes multiple light entering sections 22 (six light entering sections 22 in this embodiment) at intervals and all of the light entering sections 22 included in each light guide plate 20 have a same shape. The light entering section 22A of the upper light guide plate 20A and the light entering section 22B of the lower light guide plate 20B have plane symmetric shapes one of which is an inverted shape of another one. The light exit section 21A of the upper light guide plate 20A overlaps the light exit section 21B of the lower light guide plate 20B such that the light entering sections 22A and 22B project alternately. The light exit section 21 and the light entering section 22 are integrally formed together in each of the light guide plates 20 and do not have an interface (a connection surface) and are optically continuous to each other. The extended edge surface of the light entering section 22 is a light entering surface 22a through which light emitted by the LED 14 enters. Point light that has entered each light guide plate 20 through the light entering surface 22a travels to the light exit section 21 and is converted into planar light. The converted planar light exits the light guide plate 20 through a front side plate surface thereof that is a light exit surface 21a toward the front side (an optical member 12 side, a liquid crystal panel 2 side).

Figure 6:
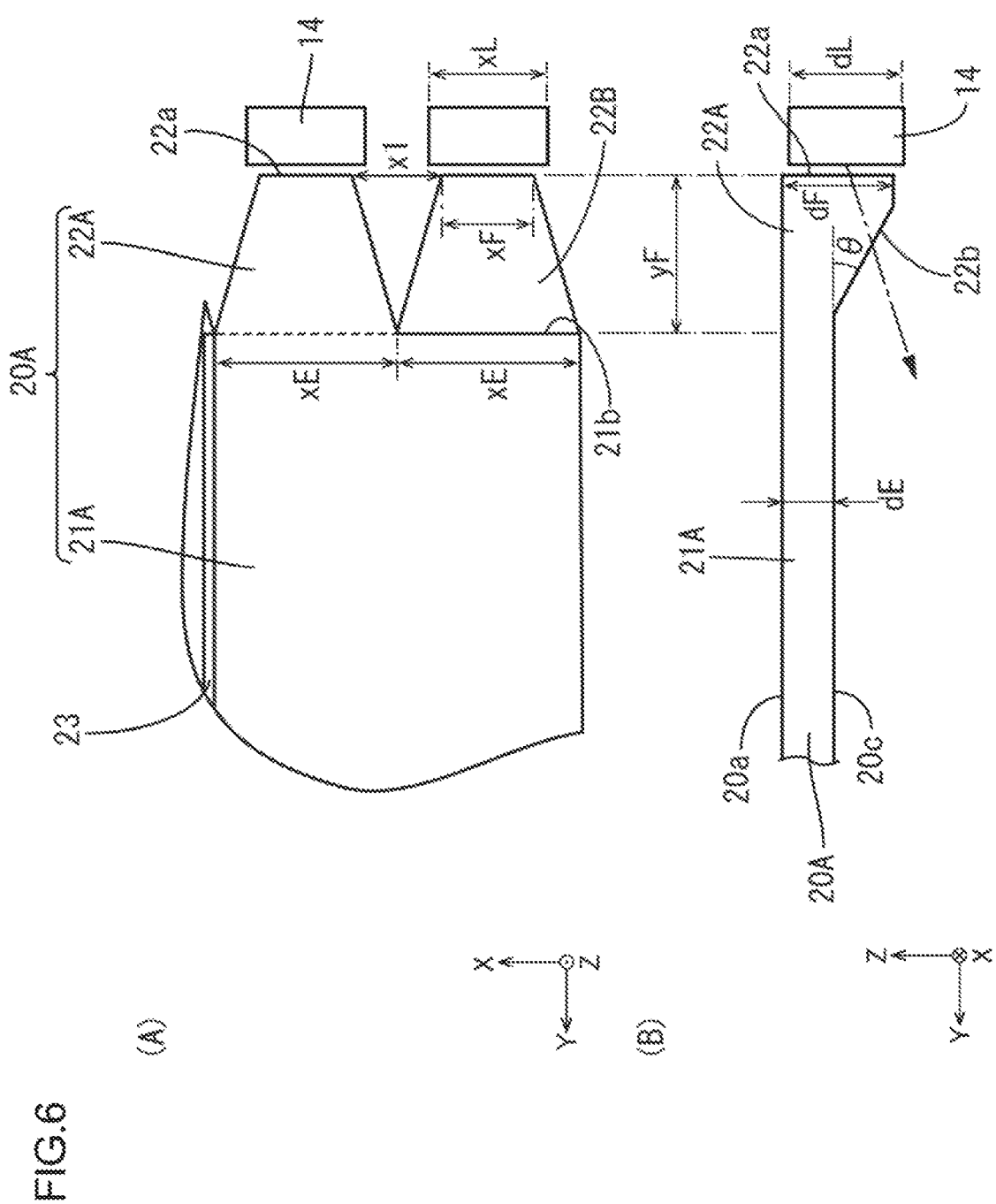
FIG. 6 is a plan view schematically illustrating arrangement relation of the light entering section of each light guide plate and the LEDs.

The light entering section 22 will be described with reference to FIG. 6 and other drawings.

As illustrated in FIGS. 1, 6(A) and other drawings, the light entering section 22 has an isosceles trapezoid in a plan view seen from a normal direction of the light exit surface 21a. In FIG. 6(A), the light entering section 22 has a width dimension xE at a basal end in the X-axis direction and a width dimension xF at an extended end in the X-axis direction and the width dimensions xE, xF satisfy xE>xF. In the light guide plate 20A or the light guide plate 20B, an interval between basal ends of the adjacent light entering sections 22A or the adjacent light entering sections 22B is xE. From a view point of increasing light use efficiency of light that is emitted by the LED 14, xF is preferably greater than a width dimension xL of the LED 14 (specifically, a width dimension of a light emission section of the LED 14) (xF>xL). In an overlapping state in which the light exit sections 21A, 21B are overlapped with each other, a distance x1 between the extended ends of the light entering section 22A and light entering section 22B that are adjacent to each other in the X-axis direction is preferably 0.2 mm or greater including a manufacturing tolerance from a viewpoint of preventing physical contact of the light entering sections 22 when the light guide plates 20 are stacked on each other. An upper limit of x1 is particularly determined; however, if x1 becomes too large, the number of LEDs 14 that can be arranged in the frame 11 is decreased and luminance may be insufficient. Therefore, x1 is preferably 2.0 mm or smaller.

As illustrated in FIG. 6(B) and other drawings, the light entering section 22 has a thickness dimension at the extended end thereof that is substantially equal to a thickness dimension of the LED 14. Namely, in FIG. 6(B), the thickness dimension dF of the extended end is almost same as the thickness dimension dL of the LED 14 (dF dL). The thickness dimension of the first edge surface 21b of the light exit section 21 that is the basal end of the light entering section 22 is equal to a thickness dimension dE of the light exit section 21 and dE is smaller than dL, which will be described later. Therefore, each light entering section 22 has an inclined surface 22b such that the thickness dimension of the light entering section gradually increases from the basal end toward the extended end. As illustrated in FIG. 4 and other drawings, the light entering section 22A of the upper light guide plate 20A has the inclined surface 22b on a back surface thereof and the light entering section 22B of the lower light guide plate 20B has the inclined surface 22b on a front surface thereof. A front surface of the light entering section 22A is flush with the light exit surface 21a of the light exit section 21A and a back surface of the light entering section 22B is flush with a back surface (another plate surface) 21c of the light exit section 21B.

In FIG. 6(B), the inclined surface 22b is inclined at an angle δ with respect to the light exit surface 21a such that the angle θ is smaller than 5 degrees (θ<5°). Therefore, if the thickness dimension of the LED 14 is represented by dL, the thickness dimension of the light exit section 21 is represented by dE, and an extended length of the light entering section 22 is represented by yF, a following formula (2) is satisfied.

$$(dL-dE)/yF < \tan 5° \approx 0.0874 \quad (2)$$

Furthermore, if the light guide plate group 20G includes the light guide plates 20 that include the light exit sections 21 of the same thickness dimension dE and the number of light guide plates 20 is n, the formula (2) is represented by a following formula (3).

$$(n-1)dE/yF < \tan 5° \approx 0.0874 \quad (3)$$

In the present embodiment, the two light guide plates 20 include the light exit sections 21 of the same thickness dimension dE. Therefore, for example, if dL is 0.4 mm and dE is 0.2 mm, the extended length yF of the light entering section 22 illustrated in FIG. 6(A) is preferably 2.3 mm or greater.

The light entering surface 22a of the present embodiment is a plane surface that is parallel to a light emission surface of the LED 14 that has a prism shape.

The light exit section 21 will be described. As illustrated in FIG. 1 and other drawings, the light exit section 21 has a quadrangular shape that can cover most portion of the hole of the frame 11 in a plan view. Specifically, a width dimension along the X-axis direction is slightly smaller than an inner width dimension of the frame 11 in the X-axis direction and a length dimension in the Y-axis direction is a length dimension obtained by subtracting a length necessary for arranging the LED board 13, the light source row 14L, and the light entering section 22 from the Y-axis inner width dimension of the frame 11. Edge surfaces of the peripheral edge surface of the light exit section 21 except for the first edge surface 21b are opposite the white long frame sections or white short frame sections of the frame 11. According to such a configuration, light that has exited the light guide plate group 20G through side edge surfaces is reflected by the frame sections and enters the light guide plate 20 again.

In the present embodiment, the thickness dimensions dE of the light exit sections 21A, 21B of the two light guide plates 20A, 20B are equal to each other. The thickness dimension of the light exit sections 21A, 21B that are stacked on each other is substantially equal to the thickness dimension dL of the LED 14. Namely, 2dE≈dL is satisfied (FIG. 6(B)).

As illustrated in FIG. 5 and other drawings, grooves (an elongated structure) 23 are formed on the light exit surface 21a that is a front surface of the light exit section 21. The grooves 23 extend in the Y-axis direction from a position of the basal end of the light entering section 22 or a position between the LEDs 14. The groove 23 has a V-shaped cross section and functions as a prism that changes a direction of the light that reaches the groove 23. As illustrated in FIG. 1, the light exit surface 12a is divided into sections by the grooves 23 such that each section has a width dimension in the X-axis direction is 2×E. Accordingly, six belt-shaped divided areas S1-S6 that extend in the Y-axis direction are formed. The groove 23 is formed to exert a so-called confine effect and to prevent the light that has travelled within one divided area S from being dispersed to adjacent another divided area S. The groove 23 is necessarily formed at least near the borders between the divided areas S and may be formed in other areas.

As illustrated in FIG. 2, the light exit section 21 includes an uneven pattern 25 on the back surface 21c thereof and the uneven pattern 25 includes lens-shaped projections that project toward the back side. The light that has travelled within the light guide plate 20 exits outside by the uneven pattern 25. In the present embodiment, the light exit surface 21a is divided into two sections with respect to the Y-axis direction as illustrated in FIG. 1. The upper light guide plate 20A includes a first uneven pattern 25A on a left region (far from the first edge surface 21b) of the back surface 21c of the light exit section 21A and the lower light guide plate 20B includes a second uneven pattern 25B on a right region (close to the first edge surface 21b) of the back surface 21c of the light exit section 21B.

As described before, as illustrated in FIG. 1, the light exit surface 21a is divided into six sections in the X-axis direction and two sections in the Y-axis direction according to a combination of the grooves 23 and the uneven patterns 25 and twelve regions A1 to A12 are formed. The twelve regions A1 to A12 have the same area and correspond to the twelve LEDs 14, respectively (a corresponding relation will be described later).

Next, operations of the backlight unit 1 according to the present embodiment that includes the above-described configuration will be described.

If a power of a liquid crystal display device that includes the backlight unit 1 is turned on, driving of the liquid crystal panel 2 is controlled by the image process circuit 41, which is not illustrated, and luminance data is sent to the lighting circuit 42. The lighting circuit 42 controls driving of each LED 14 of the backlight unit 1 according to the luminance data such that the light is supplied to the liquid crystal panel 2 and a certain image appears on the liquid crystal panel 2. Operations of the backlight unit 1 will be described in detail.

The lighting circuit 42 controls the lighting of each LED 14 according to the luminance data that is transmitted from the image process circuit 41 that is an external device. The light that is emitted by each LED 14 enters the light entering section 22 through the light entering surface 22*a* that is opposite each LED 14. The light that has entered the light entering section 22 is totally reflected by an interface between the light entering section 22 and an external air layer and is less likely to leak outside and travels within the light entering section 22 to the light exit section 21.

The light that has reached one of the divided areas S of the light exit section 21 further travels within the one divided area S and reaches a region A where the uneven pattern 25 is formed. The groove 23 restricts the light from travelling outside the divided area S. If the light reaches the uneven pattern 25 in the region A, the direction of the light is changed and this creates light rays that have an angle of incident smaller than a critical angle and most of the light rays exit the light guide plate 20 through the light exit surface 21*a* to the outside. The exiting of light through the light exit surface 21*a* can be adjusted for each of the twelve regions A1 to A12 by controlling the lighting of each of the twelve LEDs 14L1 to 14L12.

For example, the light that is emitted by the most rear side LED 13L1 enters the upper light guide plate 20A through the most rear side light entering section 22A and travels therein to the divided area S1 of the light exit section 21A and travels within the divided area S1. If the light reaches the region A1 where the first uneven pattern 25A is formed, the light exits through the light exit surface 21*a* to the outside. The light that is emitted by the sixth LED 14L6 from the rear side enters the lower light guide plate 20B through the light entering section 22B that is opposite the LED 14L6 and travels therein to the divided area S3 of the light exit section 21B. The light exits to the outside through the light exit surface 21*a* of the region A6 where the second uneven pattern 25B is formed.

Thus, for example, the exiting of light through the region A1 is adjusted by controlling the lighting of the LED 14L1 and the exiting of light through the region A6 is adjusted by controlling the lighting of the LED 14L6.

As described before, each of the LEDs 14 is controlled to be lighted on such that the light exits through the corresponding region A of the light exit surface 21*a*. Accordingly, the local dimming (control for every region) is achieved for the planar light that exits through the light exit surface of the whole backlight unit 1 that includes the twelve regions A1 to A12.

The backlight unit 1 according to the present embodiment includes the light source row 14L, the lighting circuit, and the light guide plates 20. The light source row 14L includes the LEDs 14 that are arrayed in the X-axis direction. The lighting circuit is connected to each of the LEDs 14 and configured to control the lighting of each LED 14. The light from the LEDs 14 enters the light guide plates 20 and exits the light guide plates 20 as planar light. Each of the light guide plates 20 includes the light exit section 21 and the light entering sections 22. The light exit section 21 has a plate shape and the front side plate surface thereof is the light exit surface 21*a* through which the light exits. The light entering sections 22 extend from the first edge surface 21*b* toward the light source row 14L and each of the extended end surfaces is the light entering surface 22*a* through which light enters.

The first edge surface 21*b* is on the right side one of the peripheral edge surfaces of the light exit section 21. The thickness dimension dE of the light exit section 21 is smaller than the thickness dimension dF of the light entering section 22 at the extended end thereof. The upper light guide plate 20A and the lower light guide plate 20B are stacked on each other such that the light exit sections 21 thereof are overlapped with each other in the Z-axis direction (the normal direction of the light exit surface 21*a*) and the light exit surfaces 21*a* face the front side. The upper light guide plate 20A and the lower light guide plate 20B that are stacked on each other configure the light guide plate group 20G. The light entering sections 22A of the upper light guide plate 20A and the light entering sections 22B of the lower light guide plate 20B are disposed alternately in the X-axis direction (the arrangement direction of the LEDs 14) so as not to overlap seen from the Z-axis direction.

In the backlight unit 1 according to the present embodiment, the exiting of light through the light exit surface 21*a* can be adjusted for each one of the twelve regions A1 to A12 by controlling the light that enters the light guide plates 20A, 20B. In the backlight unit 1, since the light exit section 21 of the light guide plate 20 is relatively thinner than the light entering section 22 thereof, the thickness dimension of the whole light guide plate group 20G that may be increased by the overlapping of the light exit sections 21 is less likely to be increased. Further, the light entering sections 22 that are relatively thick are not overlapped each other. Therefore, even if the light guide plates 20 are stacked on each other, the thickness dimension of the whole light guide plate group 20G is not increased by the overlapping of the light entering sections 22. The light entering sections 22A of the upper light guide plate 20A and the light entering sections 22B of the lower light guide plate 20B are aligned alternately in the X-axis direction (the arrangement direction of the LEDs 14). According to such a configuration, each of the light entering sections 22A, 22B is disposed opposite each of the LEDs 14 included in the light source row 14L such that the light efficiently enters both of the light guide plates 20A, 20B. Thus, light from one light source row 14L can enter the light guide plates 20, and therefore, increase of the thickness dimension of the backlight unit 1 or complication of wiring structure that may be caused by providing multiple light source rows are less likely to be caused.

In the present embodiment, the thickness dimension dF of the extended end of the light entering section 22 is substantially equal to the thickness dimension dL of the LED 14.

Accordingly, the light from the LED 14 is allowed to efficiently enter through the light entering surface 22*a* while increase of the thickness dimension of the backlight unit 1 being restricted.

In the present embodiment, a total of the thickness dimensions of the light exit sections 21A, 21B of the light guide plates 20A, 20B is substantially equal to the thickness dimension dL of the LED 14. Therefore, the thickness dimension of the backlight unit 1 can be reduced to be substantially equal to the thickness dimension dL of the LED 14. The front surface of the upper light guide plate 20A and the back surface of the lower light guide plate 20B can be flat. Therefore, the configuration of the light guide plate 20 can be simplified, the backlight unit can be thinner, and the light use efficiency can be improved.

In the present embodiment, the light exit surface 21*a* (the front surface) and the back surface 21*c* of the light exit section 21 are parallel to each other and the light entering section 22 includes the inclined surface 22*b* that is inclined such that the thickness dimension of the light entering section 22 gradually increases from the basal end thereof toward the extended end. The inclined surface 22b is inclined at the angle θ with respect to the light exit surface 21a or the back surface 21c such that the angle θ is 5 degrees or smaller.

Accordingly, the light that has entered through the light entering surface 22a is less likely to exit through the inclined surface 22b and the light that has entered the light entering section 22 can travel to the light exit section 21 at high efficiency to be used.

The light exit section 21 and the light entering sections 22 are integrally formed in the light guide plate 20. According to such a configuration, the number of parts is reduced and the number of mounting steps is reduced.

In the present embodiment, the light source row 14L that includes an array of the LEDs 14 is mounted on one LED board 13.

According to such a configuration, only one light source board is disposed for the multiple light guide plates 20. Therefore, the wiring is easily formed and the structure of the backlight unit 1 is simplified. Increase of the thickness dimension of the backlight unit 1 that may be caused by providing multiple light source boards is less likely to be caused and the backlight unit 1 is reduced in size.

In the present embodiment, from a viewpoint of improving brightness of the light exit surface and high contrast, the LED 14 that has high light emission intensity and high light directivity is used as the light source. Further, from a viewpoint of reducing a thickness of the backlight unit 1, the side-surface light-emitting type LED is used as the LED 14.

In the present embodiment, the light entering surfaces 22a of the light guide plates 20A, 20B are on the same plane surface and the LED board 13 is fixed to all of the light guide plates 20 at the light entering sections 22A, 22B.

According to such a configuration, the light guide plates 20 are fixed to the LED board 13 with a simple structure of using one double-sided adhesive tape 33. As a result, unnecessary space is less likely to be created between the LED 14 and the light guide plate 20 and the light use efficiency is improved and brightness of the light exit surface 21a is improved.

In the present embodiment, in each of the upper light guide plate 20A and the lower light guide plate 20B, the light entering sections 22 that extend from the first edge surface 21b of the light exit section 21 in the Y-axis direction are arranged at intervals in the X-axis direction (the arrangement direction of the LEDs 14). The light entering sections 22A of the upper light guide plate 20A and the light entering sections 22B of the lower light guide plate 20B are arranged such that the light entering sections 22 of the same light guide plate 20 are not disposed next to each other in a plan view from the Z-axis direction (the normal direction of the light exit surface 21a).

In other words, the light entering sections 22A of the upper light guide plate 20A and the light entering sections 22B of the lower light guide plate 20B extend alternately and face the light source row 14L. Therefore, the light from the LEDs 14 can enter each of the upper light guide plate 20A and the lower light guide plate 20B through each of the light entering sections 22A, 22B efficiently. Accordingly, the local dimming as described below can be achieved with high contrast. In the local dimming, the light emission by the LEDs 14 is controlled to adjust the exiting of light that exits through the light exit surface 21a for every belt-like shaped divided area S that extends in the Y-axis direction (the normal direction of the light entering surface 22a).

In the present embodiment, the light entering section 22A of the upper light guide plate 20A and the light entering section 22B of the lower light guide plate 20B that are adjacent to each other in a plan view seen from the Z-axis direction (the normal direction of the light exit surface 21a) are disposed such that a space between the extended ends thereof is from 0.2 mm to 2.0 mm.

According to such a configuration, when the upper light guide plate 20A and the lower light guide plate 20B are stacked on each other, the adjacent light entering sections 22A, 22B are less likely to be contacted with each other and can be positioned in a correct position easily.

The width dimension xF of the light entering section 22 at the extended end thereof in the X-axis direction (the arrangement direction of the LEDs 14) is substantially same as the width dimension xL of the LED 14 in the same direction. This allows the light from the LEDs 14 to enter through the light entering surfaces 22a effectively.

In the present embodiment, the light exit section 21 is divided into the six belt-shaped divided areas S1-S6 by the five grooves 23 that extend in the Y-axis direction (the normal direction of the light entering surface 22a). One light entering section 22 extends from a portion of the first edge surface 21b of each light guide plate 20 corresponding to each divided area S and the extended end surface is the light entering surface 22a through which the light from the LED 14 enters.

The grooves 23 that have a function of prisms keep the light to stay within the belt-like shaped divided area S that extends in the Y-axis direction (the normal direction of the light entering surface 22a). Accordingly, the light directivity is increased and the light is less likely to travel to the adjacent divided area S. According to the present embodiment, the light that has emitted by the LEDs 14 in each divided area S and entered the light entering section 22 can travel to the light exit section 21 efficiently. Luminance contrast is increased for every divided area S1 to S6 of the light exit surface 21a and power consumption becomes less.

In the present embodiment, one LED 14 and one light entering section 22 are disposed corresponding to each divided area S. Therefore, the light exit surface 21a is divided into the same number of sections as the number of LEDs 14 (twelve) and the exiting of light through the light exit surface 21a can be adjusted for every small region.

In the present embodiment, the light guide plates 20 include the upper light guide plate 20A and the lower light guide plate 20B that is disposed on the back surface side of the upper light guide plate 20A. The light exit section 21A of the upper light guide plate 20A includes the first uneven pattern 25A on the back surface 21c thereof and the first uneven pattern 25A makes the light that has entered through the light entering surface 22a to exit through the light exit surface 21a. The light exit section 21B of the lower light guide plate 20B includes the second uneven pattern 25B on the back surface 21c thereof and the second uneven pattern 25B makes the light that has entered through the light entering surface 22a to exit through the light exit surface 21a. The first uneven pattern 25A and the second uneven pattern 25B are arranged so as not to overlap each other seen from the Z-axis direction (the normal direction of the light exit surface 21a).

The first uneven pattern 25A or the second uneven pattern 25B is disposed in any position of the upper light guide plate 20A and the lower light guide plate 20B. According to such a configuration, the light that has travelled within each of the light guide plates 20 changes its travel direction at the position to exit the light guide plate 20. The light exit surface 21a is divided into areas with respect to the Y-axis direction (the normal direction of the light entering surface 22a) such that the exiting of light through the light exit surface 21a can be adjusted for every area. The exiting of light is adjusted for every belt-shaped divided area by controlling lighting of the LEDs 14 and the two-dimensional local dimming can be achieved as well. The first uneven pattern 25A and the second uneven pattern 25B are arranged so as not to overlap each other such that the luminance contrast of the light exit surface 21a is increased for every area A corresponding to the pattern.

In the present embodiment, the first uneven pattern 25A and the second uneven pattern 25B include lens projections but may include prisms or embosses. The first uneven pattern 25A and the second uneven pattern 25B may have the same shape or may have different shapes.

In the present embodiment, the second uneven pattern 25B of the lower light guide plate 20B is arranged relatively on the right side of (closer to the light entering section 22 than) the first uneven pattern 25A of the upper light guide plate 20A.

The lower light guide plate 20B is disposed farther away from the liquid crystal panel 2 than the upper light guide plate 20A is. Therefore, the light is likely to be dispersed within the lower light guide plate 20B before reaching the liquid crystal panel 2. The second uneven pattern 25B is closer to the light entering section 22. Therefore, compared to a configuration including the first uneven pattern 25A closer to the light entering section 22, there is less occurrence of unevenness in the exiting of light (spot unevenness) in a portion near the light entering section 22. Such unevenness may be caused if the light from the LED 14 does not sufficiently reach the portion.

<First Modification of First Embodiment>

A first modification of the first embodiment will be described with reference to FIGS. 7 and 8. In a backlight unit 101 according to the first modification, a surface and a position where an uneven pattern 125 is disposed are different from those of the first embodiment. Components same as those of the first embodiment are provided with the same symbols and operations and effects similar to those of the first embodiment will not be described (also in a second modification and a second embodiment).

Figure 7:
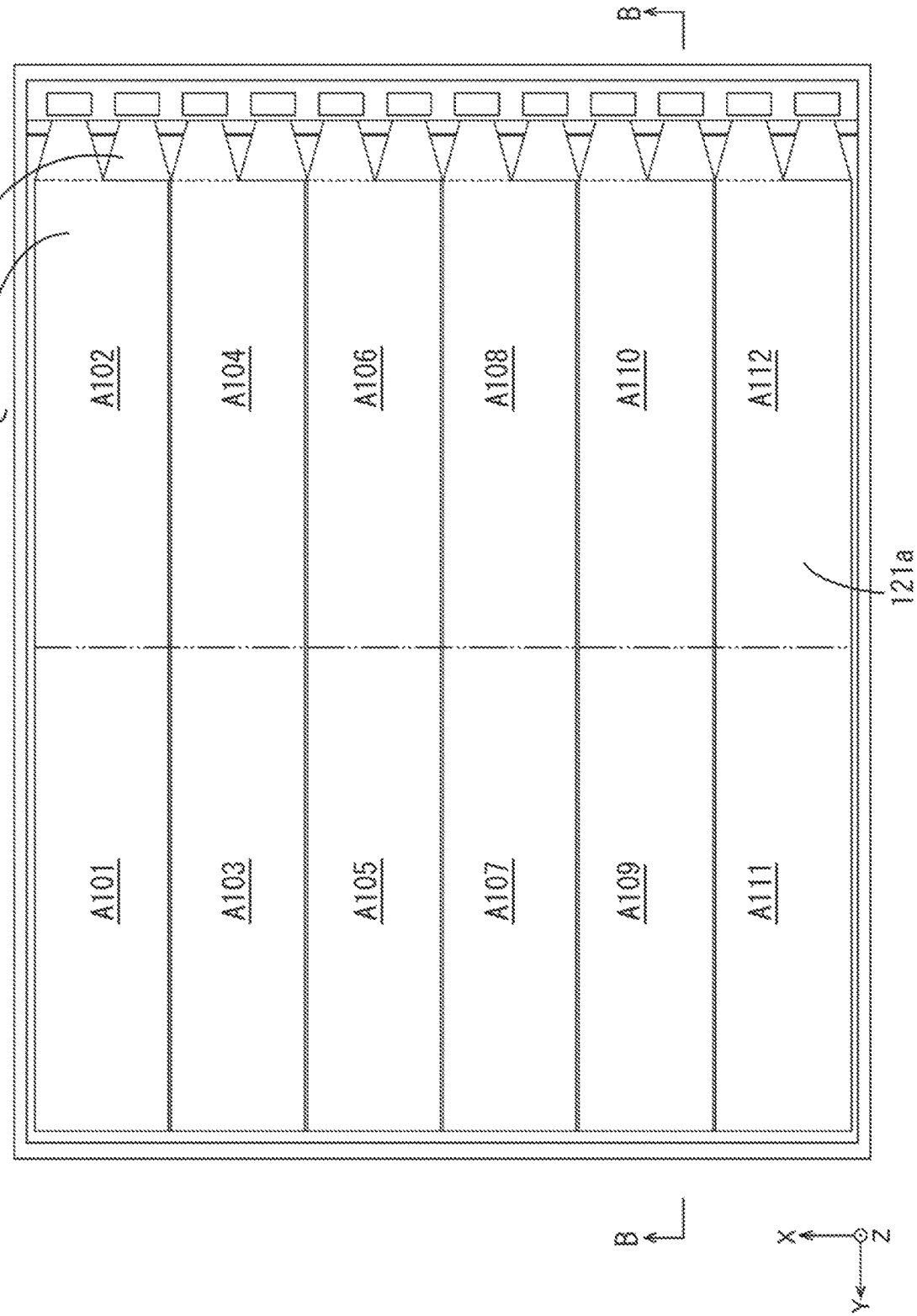
FIG. 7 is a partially-exploded plan view illustrating a schematic configuration of a lighting device according to a first modification of the first embodiment.
Figure 8:
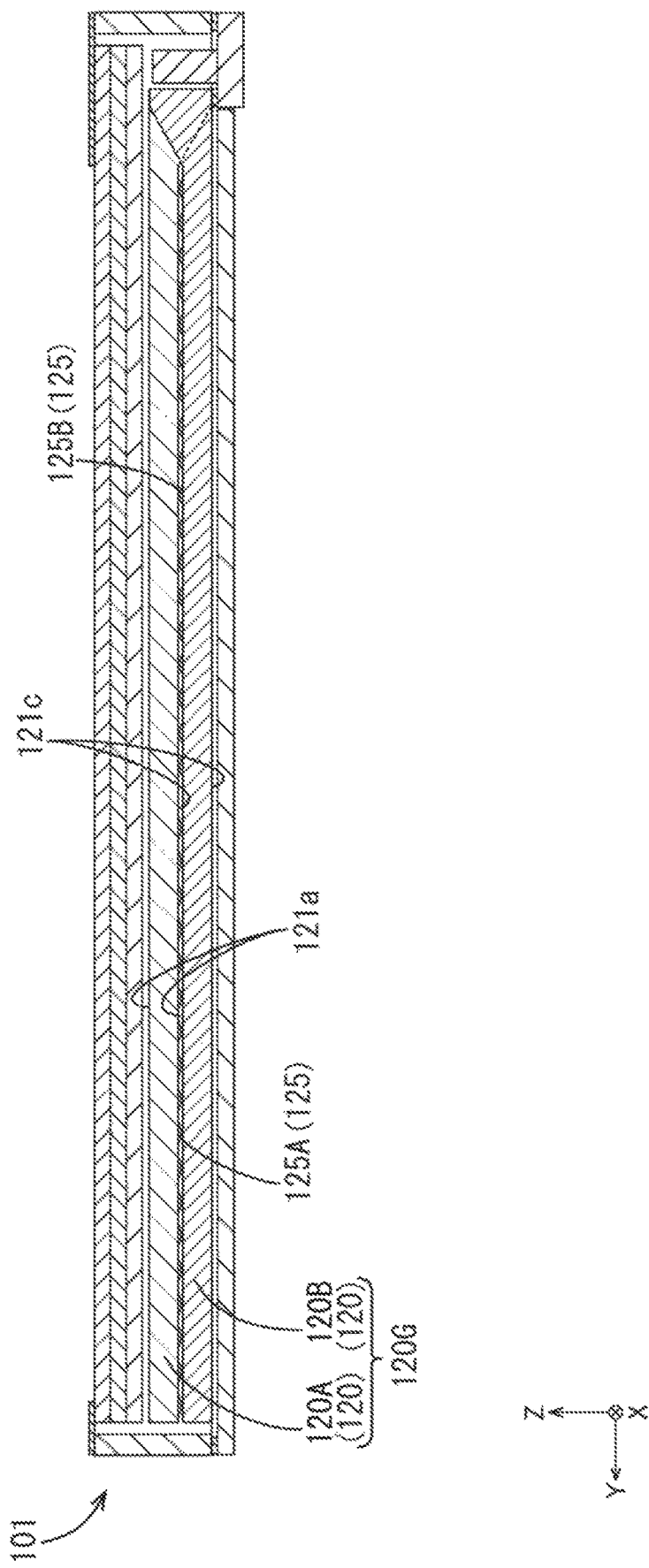
FIG. 8 is a cross-sectional view illustrating a cross-sectional configuration of the lighting device according to the first modification of the first embodiment taken along line B-B in FIG. 7.

As illustrated in FIG. 7, a light guide plate group 120G of the backlight unit 101 includes twelve regions A1 to A12 on a light exit surface 121a thereof. First uneven patterns 125A and second uneven patterns 125B are disposed on the regions A1 to A12 such that the first uneven patterns 125A are not adjacent to each other and the second uneven patterns 125B are not adjacent to each other seen from the Z-axis direction (a normal direction of the light exit surface 121a). The first uneven patterns 125A and the second uneven patterns 125B are arranged in a so-called checkered pattern. Namely, in FIG. 7, the first uneven pattern 125A is disposed on a section overlapping each of the regions A101, A104, A105, A108, A109, A112, and the second uneven pattern 125B is disposed on a section overlapping each of the regions A102, A103, A106, A107, A110, A111. As illustrated in FIG. 8, all the uneven patterns 125 are formed on opposing surfaces of the two light guide plates 120 with respect to the Z-axis direction. Namely, the first uneven patterns 125A are formed on a back surface 121c of the upper light guide plate 120A and the second uneven patterns 125B are formed on a front side light exit surface 121a of the lower light guide plate 120B.

According to such a configuration, the upper light guide plate 120A and the lower light guide plate 120B have completely the same shape and size. Namely, the two light guide plates 120 that have the same shape and size are stacked on each other while one of them being turned over to configure the light guide plate group 120G. In the light guide plate group 120G, a front surface of the light guide plate that is regarded as the light exit surface 121a of the upper light guide plate 120A is to be disposed on a back surface side of the lower light guide plate 120B and a surface of the light guide plate that is on a back surface side of the upper light guide plate 120A is to be disposed on a front surface side of the lower light guide plate 120B and regarded as the light exit surface 121a. According to such a configuration, a cost for manufacturing the light guide plates is reduced and management of parts becomes easy.

<Second Modification of First Embodiment>

Figure 9:
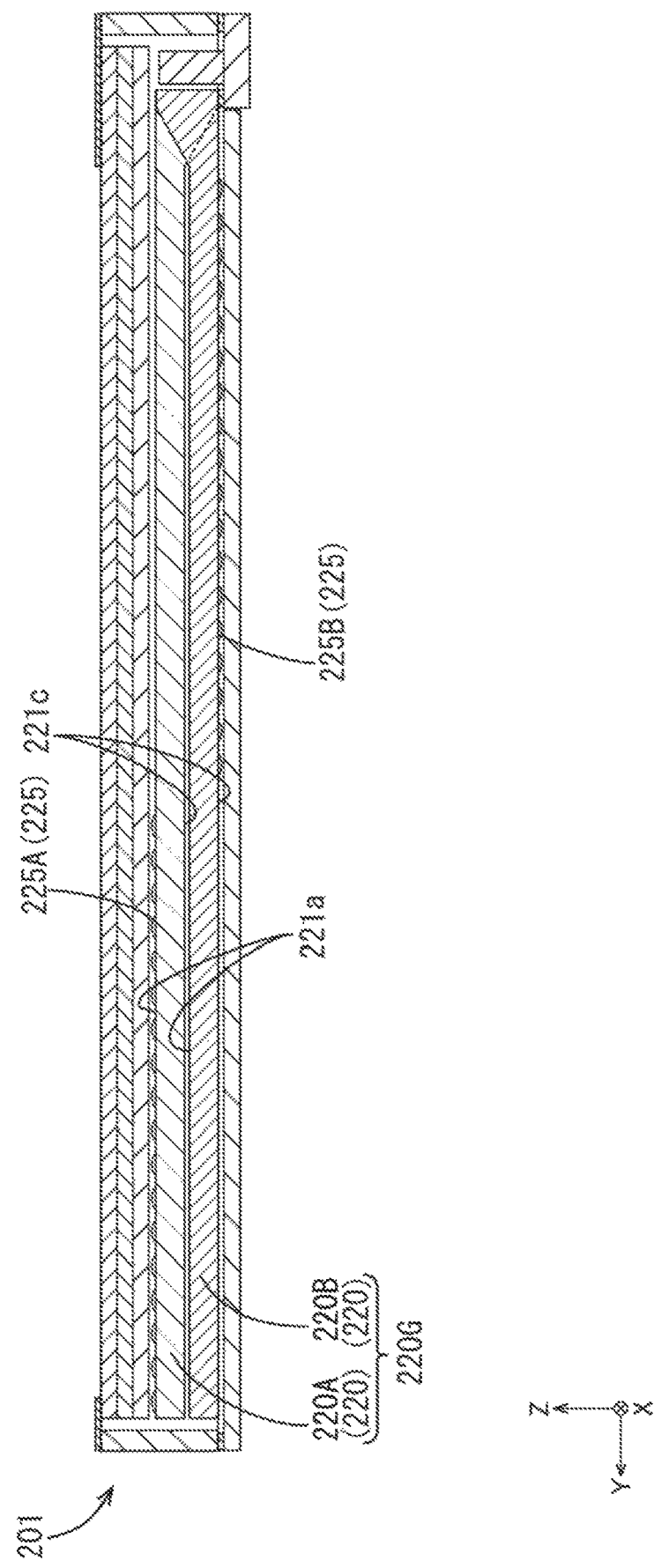
FIG. 9 is a cross-sectional view illustrating a cross-sectional configuration of a lighting device according to a second modification of the first embodiment.

A second modification of the first embodiment will be described with reference to FIG. 9. In a backlight unit 201 according to the second modification, a surface where an uneven pattern 225 is disposed differs from that of the backlight unit 101 according to the first modification of the first embodiment.

In a light guide plate group 220G of the backlight unit 201, first uneven patterns 225A and second uneven patterns 225B are arranged in a so-called checkered pattern in a plan view similar to the arrangement of the first uneven patterns 125A and the second uneven patterns 125B in the light guide plate group 120G according to the first modification of the first embodiment. On the other hand, with respect to the Z-axis direction, as illustrated in FIG. 9, all of the uneven patterns 225 are disposed on outer surfaces of two light guide plates 220A, 220B. Namely, the first uneven patterns 225A are disposed on a light exit surface 221a of the upper light guide plate 220A and the second uneven patterns 225B are disposed on a back surface 221c of the lower light guide plate 220B.

With the configuration of the present modification, two light guide plates 220 that have the same shape and size are stacked on each other and one of which is turned over can be used as the upper light guide plate 220A and the lower light guide plate 220B. Therefore, effects similar to those of the first modification can be obtained.

<Third Modification of First Embodiment>

Figure 10:
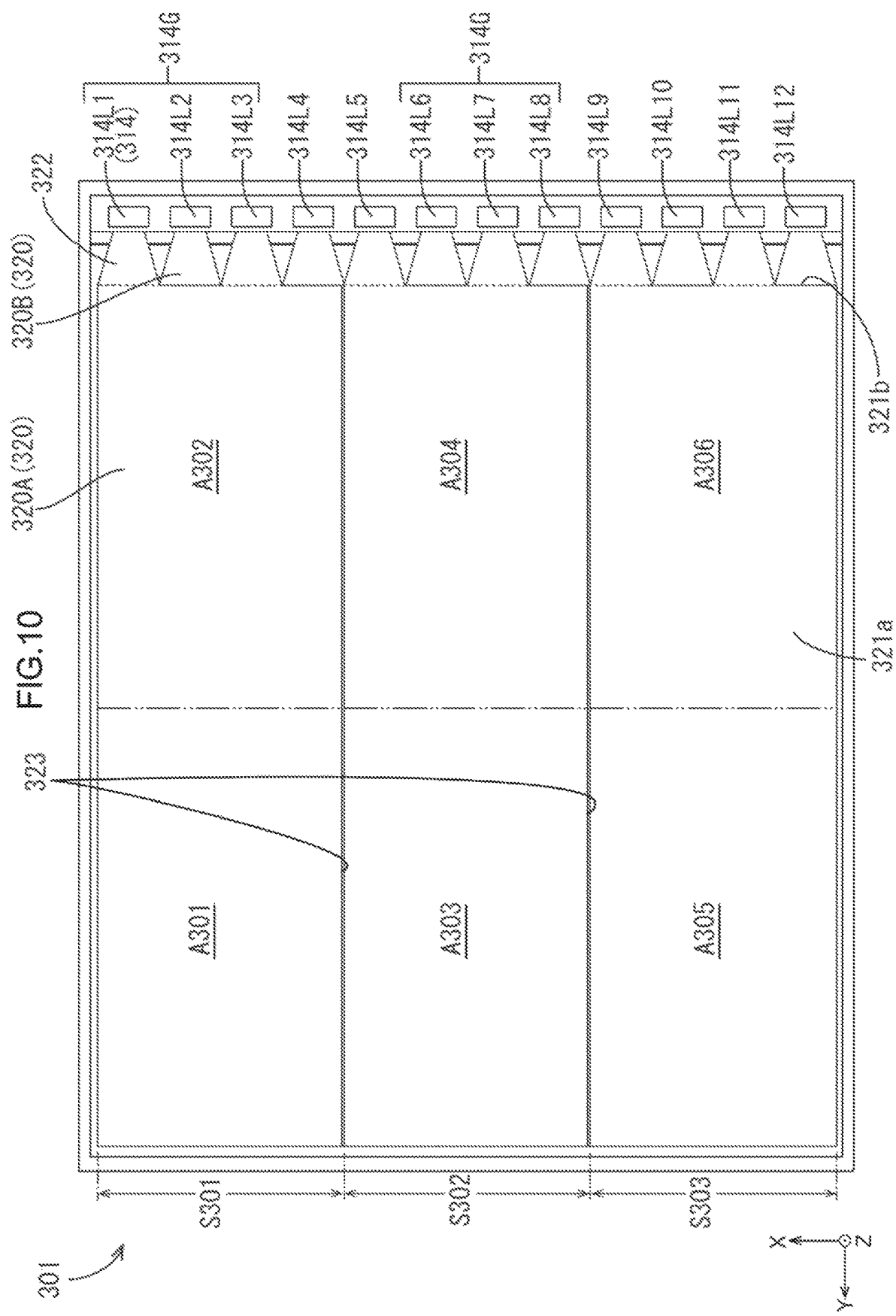
FIG. 10 is a partially-exploded perspective view illustrating a schematic configuration of a lighting device according to a third modification of the first embodiment.

A third modification of the first embodiment will be described with reference to FIG. 10. In a backlight unit 301 according to the third modification, positions where grooves 323 are formed are altered from those of the backlight unit 1 of the first embodiment.

The backlight unit 301 includes light guide plates 320 and the light guide plate 320 includes two grooves 323 on a light exit surface 321a thereof. The light exit surface 321a is divided into three divided areas S301 to S303 each of which has a width dimension 4xE in the X-axis direction (a width dimension of a light entering section 322 in the X-axis direction at a basal end thereof is referred to as xE). Two light entering sections 322 extend from a portion of a first edge surface 321b of each of an upper light guide plate 320A and a lower light guide plate 320B corresponding to each divided area S and each of the two light entering sections 322 is opposite a LED 314. Among the LEDs 314, two LEDs 314 are opposite the light entering sections 322 that are disposed in the same divided area S and the two LEDs 314 are included in a light source group 314G. The LEDs 314 included in each light source group 314G are connected to the lighting circuit so as to be connected to each other in series and all of the light source groups 314G are connected in parallel. The LEDs 314 that are disposed in each light source group 314G may be connected to each other in parallel. Specifically, in FIG. 10, among the LEDs 314L1 to 314L12 that are arrayed from the rear side to the front side, each of a set of a LED 314L1 and a LED 314L3, a set of a LED 314L2 and a LED 314L4, a set of a LED 314L5 and a LED 314L7, a set of a LED 314L6 and a LED 314L8, a set of a LED 314L9 and a LED 314L11, and a set of a LED 314L10 and a LED 314L12 configures the light source group 314G.

In this modification, the exiting of light through the light exit surface 321a can be adjusted for each of six regions A301 to A306 by controlling the lighting of the LED 314 by a unit of the light source group 314G. For example, the lighting of the light source group 314G that includes the LED 314L1 and the LED 314L3 is controlled to adjust the exiting of light through the region A301 and the lighting of the light source group 314G that includes the LED 314L6 and the LED 314 L8 is controlled to adjust the exiting of light through the region A304.

According to this modification, the wiring structure for the LEDs 314 is simplified and the lighting control can be performed more easily. The light from the two LEDs 314 is supplied to one region A and exit therethrough and luminance of each area A can be increased.

Second Embodiment

Figure 11:
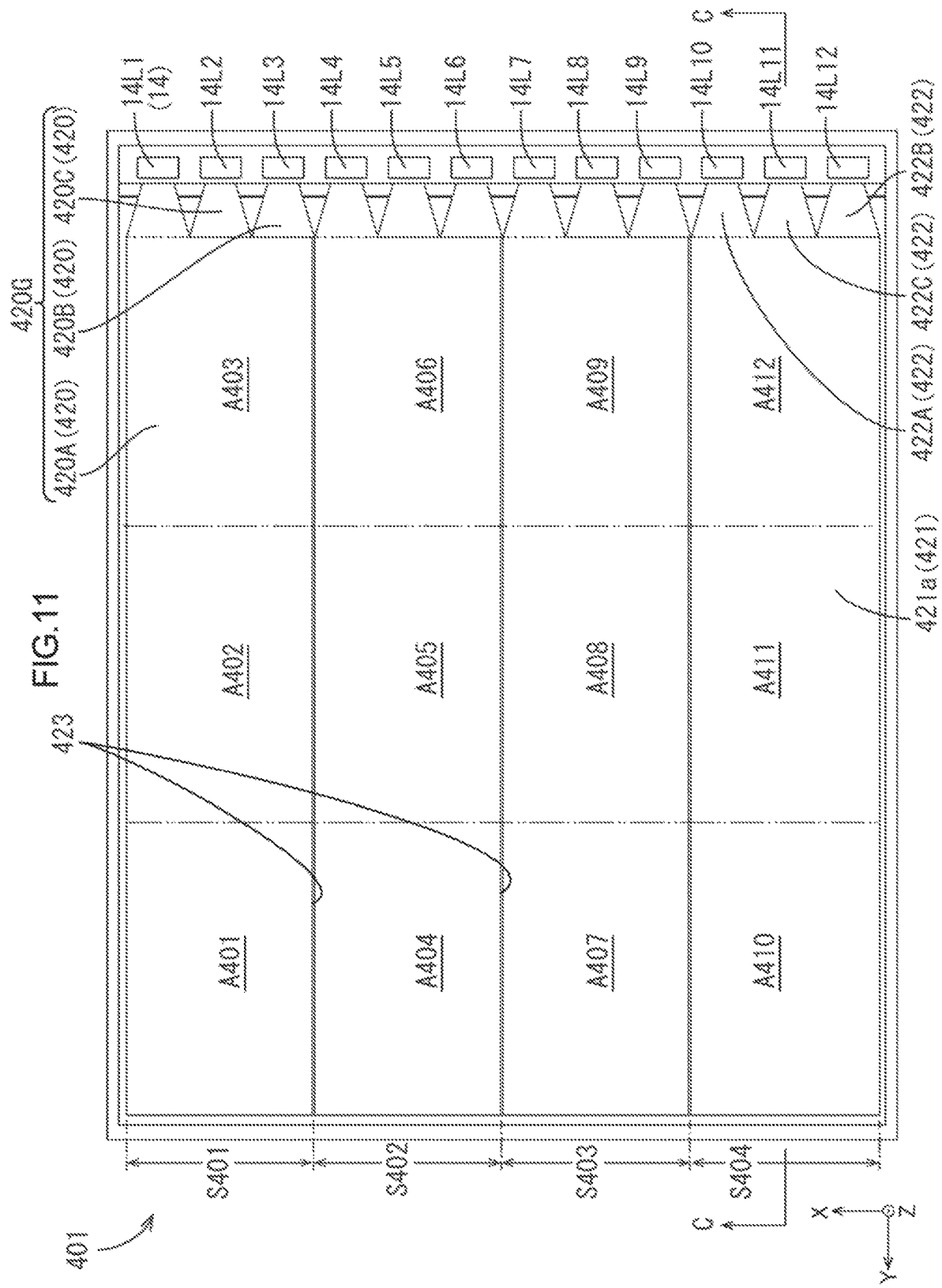
FIG. 11 is a partially-exploded plan view illustrating a schematic configuration of a lighting device according to a second embodiment.
Figure 12:
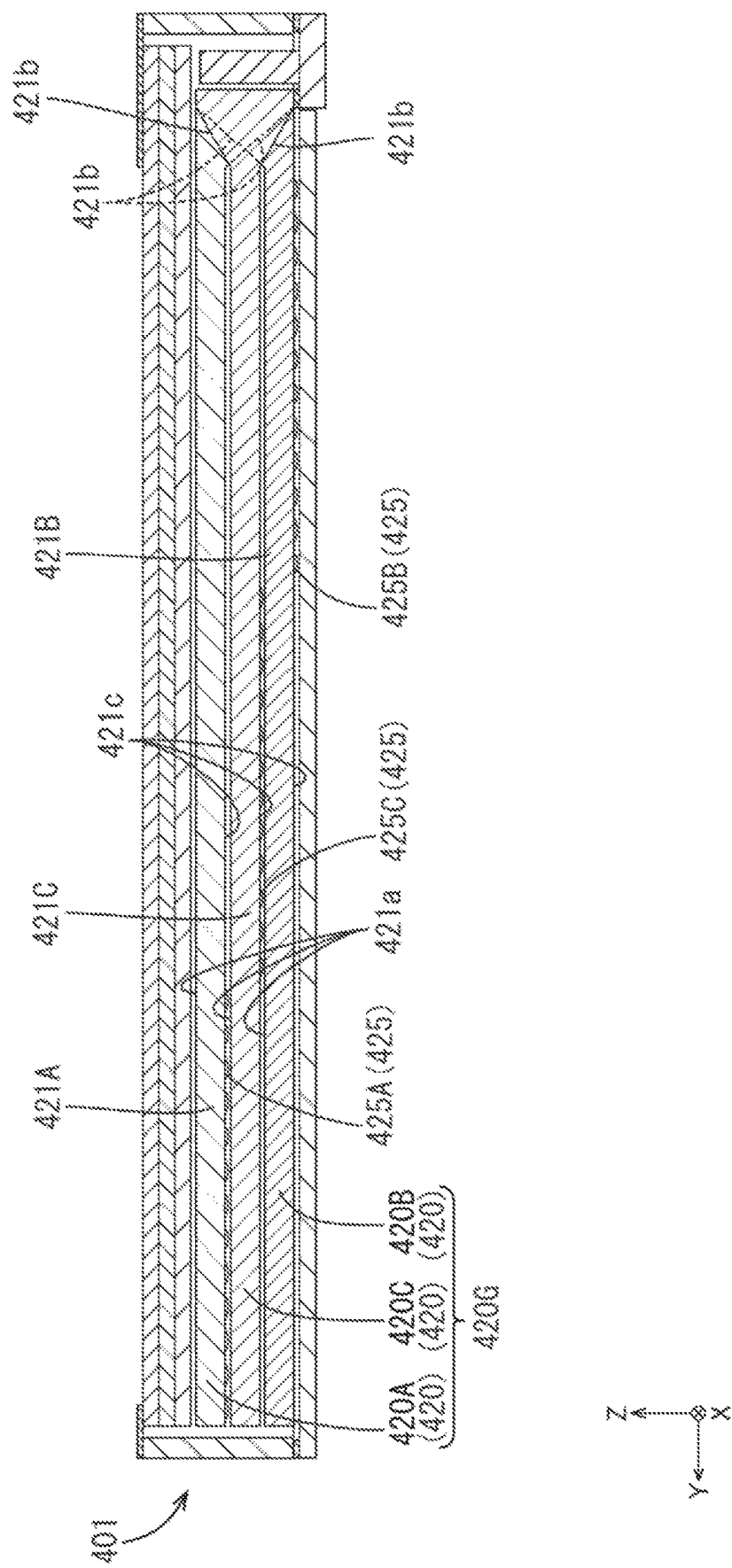
FIG. 12 is a cross-sectional view illustrating a cross-sectional configuration of the lighting device according to the second embodiment taken along line C-C in FIG. 11.

A second embodiment will be described with reference to FIGS. 11 and 12. A backlight unit 401 according to the second embodiment greatly differs from the backlight unit 1 of the first embodiment as follows. In the backlight unit 401, a light guide plate group 420G includes three light guide plates 420 of an upper light guide plate 420A, a lower light guide plate 420B, and an intermediate light guide plate 420C.

According to this embodiment, each of the three light guide plates 420 includes four light entering sections 422. Each of an interval between the adjacent light entering sections 422A of the upper light guide plate 420A, an interval between the adjacent light entering sections 422B of the lower light guide plate 420B, and an interval between the adjacent light entering sections 422C of the intermediate light guide plate 420C is 2×E while the width dimension of the light entering section 422 in the X-axis direction at a basal end thereof being xE. As illustrated in FIG. 11, the light entering sections 422B, 422C, 422A (422) project from respective light exit sections 421 that are overlapped with each other in this sequence from the front side. As illustrated in FIG. 12, the light entering section 422A of the upper light guide plate 420A includes an inclined surface. 421b on a back surface thereof, the light entering section 422B of the lower light guide plate 420B includes the inclined surface 421b on a front surface thereof, and the light entering section 422C of the intermediate light guide plate 420C includes the inclined surfaces 421b on front and back surfaces thereof. The inclined surface 421b is inclined such that the thickness dimension of the light entering section 422 gradually increases from the basal end toward the extended end thereof.

The light exit section 421 of each of the three light guide plates 420 of the present embodiment has a thickness dimension dE that is defined as 3dE≈dL with respect to the thickness dimension dL of the LED 14. As illustrated in FIG. 11, the light exit section 421 includes three grooves 423 on a front side light exit surface 421a and the light exit surface 421a is divided into four divided areas S401 to S404 each of which has a width dimension 3xE in the X-axis direction. The light exit surface 421a is divided into three sections with respect to the Y-axis direction. As illustrated in FIG. 12, the light exit section 421A of the upper light guide plate 420A includes a first uneven pattern 425A on a left side region of a back surface 421c, the light exit section 421C of the intermediate light guide plate 420C includes a third uneven pattern 425C on a middle region of the back surface 421c, and the light exit section 421B of the lower light guide plate 420B includes a second uneven pattern 425B on a right side region of the back surface 421c.

As described before, the light exit surface 421a is divided into four sections in the X-axis direction and three sections in the Y-axis direction according to a combination of the grooves 423 and the uneven patterns 425 and twelve regions A401 to A412 are formed. In this embodiment, all of the twelve regions A401 to A412 have the same area and correspond to the twelve LEDs 14, respectively.

According to the present embodiment, the light exit surface 421a is divided into the regions A each of which has a different shape from that of the first embodiment and exiting of light is adjusted. In the present embodiment, the number of light guide plates 420 is greater than that of the first embodiment and three light guide plates 420 are stacked on each other. However, the thickness dimension dE of each of the light exit sections 421 is further reduced and a thickness dimension of the whole light guide plate group 420G is less likely to be increased.

Third Embodiment

A third embodiment will be described with reference to FIGS. 13 and 14. A backlight unit 501 according to the third embodiment includes a light source row 514L on a left side of a light guide plate group 520G in addition to the light source row 14L on a right side thereof.

Figure 13:
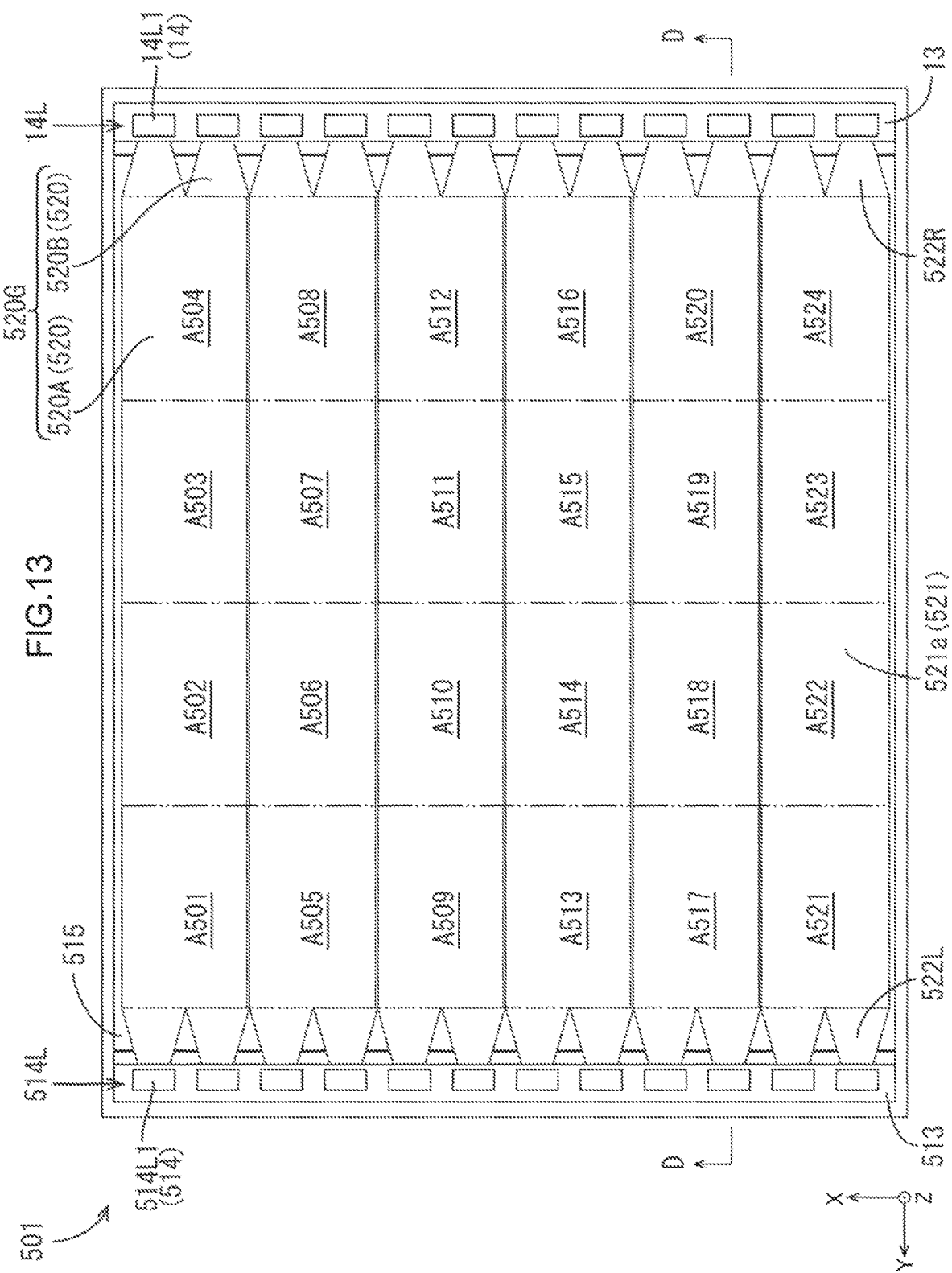
FIG. 13 is a partially-exploded plan view illustrating a schematic configuration of a lighting device according to a third embodiment.
Figure 14:
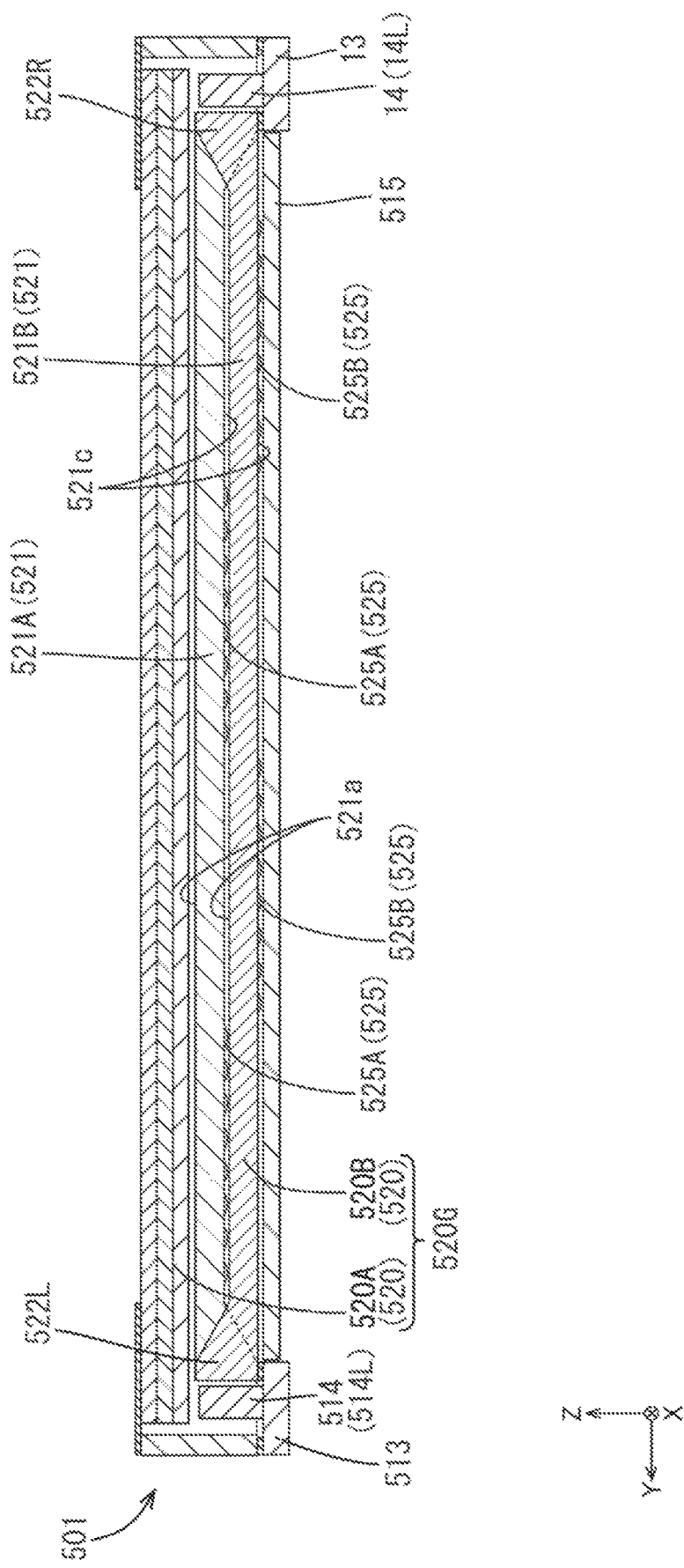
FIG. 14 is a cross-sectional view illustrating a cross-sectional configuration of the lighting device according to the third embodiment taken along line D-D in FIG. 13.

As illustrated in FIGS. 13 and 14, in the present embodiment, a LED board 513 is disposed on a left short side frame section of the frame 11. The LED board 513 is similar to the LED board 13 that is disposed on a back surface of the right short side frame section. Twelve LEDs 514 that are mounted on the LED board form the light source row 514L. The LED board 513 is fixed parallel to the LED board 13 and a reflection sheet 515 is held between the LED board 513 and the LED board 13 in the Y-axis direction. Optical axis of each of the LEDs 514 that are included in the light source row 514L substantially matches the Y-axis direction and a light exit direction of the LED 514 is opposite from that of the LED 14.

Each of an upper light guide plate 520A and a lower light guide plate 520B included in the light guide plate group 520G includes light entering sections 522R and light entering sections 522L. The light entering sections 522R extend from the light exit section 521 of each of the light guide plates 520A, 520B toward a right side and face the respective LEDs 14. The light entering sections 522L extend from the light exit section 521 of each of the light guide plates 520A, 520B toward a left side and face the respective LEDs 14. The shape and the dimension of the right side light entering section 522R are similar to those of the light entering section 22 of the first embodiment. The left side light entering section 522L has an inverted shape of the light entering section 522R with respect to the left and right direction. Namely, each of the light guide plates 520 has a plane symmetric shape with respect to a plane that passes through a center line of the light exit section 521 with respect to the Y-axis direction and has a normal line along the Y-axis.

As illustrated in FIG. 13, a light exit surface 521a is divided into four sections with respect to the Y-axis direction. As illustrated in FIG. 14, first uneven patterns 525A are disposed on left edge regions and third regions from the left of a back surface 521c of a light exit section 521A of the upper light guide plate 520A, and second uneven patterns 525B are disposed on second regions from the left and right edge regions of the back surface 521c of a light exit section 521B of the lower light guide plate 520B.

As described before, as illustrated in FIG. 13, the light exit surface 521a is divided into six sections in the X-axis direction and four sections in the Y-axis direction according to a combination of the grooves 23 and the uneven patterns 525 and twenty four regions A501 to A524 are formed. In this embodiment, all of the twenty four regions A501 to A524 have the same area and correspond to the twenty four LEDs 14, 514, respectively.

According to the present embodiment, compared to the first embodiment, the exiting of light through the light exit surface 521a can be adjusted for each of smaller regions A and display image resolution can be enhanced. The number of light sources for supplying light that exits through the light exit surface 521a is increased to increase luminance of the light exit surface 521a or increase the size of the light exit surface 521a while suppressing increase of a thickness dimension of the light guide plate group 520G and eventually suppressing increase of a thickness dimension of the backlight unit 501.

The regions A where the first uneven patterns 525A are disposed are not adjacent to each other in the normal direction of the light entering surface and the regions A where the second uneven patterns 525B are disposed are not adjacent to each other in the normal direction of the light entering surface. Therefore, the light that has not exited through a target region A and travelled within the light guide plate 520 is less likely to be directed by the uneven pattern 525 that is disposed on the adjacent region A. For example, the light that has emitted by the right and most rear side LED 14L1 is supposed to exit through the region A503. However, if the first uneven pattern 525A is disposed on the adjacent region A502, the light that has not exited through the region A503 and further travelled within the light guide plate in the Y-axis direction may easily exit through the region A502 by the first uneven pattern 525A. According to the present embodiment, the first uneven pattern 525A is not disposed on the region A502. Therefore, unintentional exiting of light through the region A is less likely to occur. Accordingly, high luminance contrast of the light exit surface 521a can be maintained and quality of display images can be increased.

Other Embodiments

The technology disclosed herein is not limited to the embodiments, which have been described using the foregoing descriptions and the drawings. For example, embodiments described below are also included in the technical scope of the technology.

(1) In each of the above embodiments, the light guide plates are formed in a flat plate shape; however, it is not necessarily limited thereto but they may be formed in a curved shape. The light guide plates have a quadrangular plan view shape; however, it is not necessarily limited thereto but they may have a plan view shape of a polygonal shape such as a triangle or a pentagon or a plan view shape that has a curved outline such as an oval.

(2) In each of the above embodiments, the light exit sections of all of light guide plates that are included in a lighting device are overlapped with each other. However, it is not necessarily limited thereto and the light guide plates may be arranged such that some of them overlap each other. Entire areas of the light exit sections are not necessarily overlapped with each other and a portion of the light exit section may overlap another light exit section. The light guide plate group may include four or more light guide plates. If the number of light guide plates included in the light guide plate group is n, a total of the thickness dimensions of the light exit sections is preferably equal to or smaller than the thickness dimension of the light source row. However, it is not necessarily limited thereto.

(3) In each of the above embodiments, all of the light guide plates that are included in the light guide plate group are made of the same material (acrylic resin). However, they may be made of different materials. The thickness dimensions of the light exit sections of the light guide plates are equal to each other. However, it is not limited thereto and the thickness dimensions of the light exit sections may be varied according to arrangement or characteristics of the light guide plates.

(4) In each of the above embodiments, the reflection sheet is disposed on the back side of the light guide plate group. Instead of disposing the reflection sheet, a reflection layer may be disposed on a back surface of the light guide plate. A reflection layer may be disposed on peripheral edge surfaces except for the light entering surface.

(5) A light scattering section may be included in the light exit surface to unify a light exit distribution within each region of the light exit surface. The light scattering section is provided by printing dots made of light scattering particles on the light guide plate, forming a rough surface by blasting, or forming quite small projections and recesses when molding a light guide plate with resin.

(6) In each of the above embodiments, the light source row is arranged along the short side of the light guide plate (in the X-axis direction); however, it is not limited thereto. Alight source row may be arranged along one long side or two long sides (in the Y-axis direction).

(7) In each of the above embodiments, the light entering section has a prism shape; however, it is not limited thereto. The light entering section may have a round columnar shape or an elliptical columnar shape.

(8) In each of the above embodiments, the light entering section and the light exit section are integrally formed with each other. The light guide section and the light exit section may be formed as separated components. In such a configuration, optical fibers may be used as the light guide section. The separate components of the light guide section and the light exit section may be bonded to each other with adhesive and formed as an integral component.

(9) In each of the above embodiments, the LEDs are used as the light source; however, another kinds of light sources such as cold cathode tubes or an organic ELs may be used as the light source.

(10) In each of the above embodiments, the liquid crystal display device that includes the liquid crystal panel as the display panel; however, a display device that includes another kinds of display panel may be included in the technical scope.

EXPLANATION OF SYMBOLS

1: backlight unit (lighting unit), 2: liquid crystal panel (display panel), 13: LED board (light source board), 14: LED (light source), 14G: light source group, 14L: light source row, 20: light guide plate, 20A: upper light guide plate (first light guide plate), 20B: lower light guide plate (second light guide plate), 20G: light guide plate group, 21: light exit section, 21a: light exit surface, 21b: first edge surface (first edge surface), 21c: back surface (another plate surface), 22: light exit section, 22a: light entering surface, 22b: inclined surface, 23: groove (elongated structure), 25: uneven pattern, 42: lighting circuit

The invention claimed is:

1. A lighting device comprising:
   a light source row including light sources that are arrayed;
   a lighting circuit connected to the light sources and configured to control lighting of the light sources by a unit of a light source group that includes at least one of the light sources; and
   light guide plates that light from the light sources enters and the light exits as planar light, each of the light guide plates being formed in a plate shape and having one plate surface and another plate surface, each of the light guide plates including
     a light exit section including the one plate surface as a light exit surface through which the light exits, and
     a light entering section extending from a first edge surface of peripheral edge surfaces of the light exit section toward the light source row and including an extended end surface as a light entering surface through which the light from the light source enters, wherein
   the light exit section has a thickness dimension that is smaller than a thickness dimension of the light entering section at an extended end thereof,
   the light guide plates include at least two light guide plates that configure a light guide plate group, and the at least two light guide plates are stacked on each other such that the light exit sections thereof overlap each other seen from a normal direction of the light exit surface and the light exit surfaces thereof face a same direction,
   in the light guide plate group, the light entering section of one light guide plate and the light entering section of another light guide plate are disposed next to each other in an arrangement direction of the light sources so as not to overlap each other seen from the normal direction of light exit surface,
   the light exit surface and the other plate surface of the light exit section are parallel to each other,
   the light entering section has an inclined surface such that the thickness dimension of the light entering section gradually increases from a basal end thereof toward the extended end, and
   the inclined surface is inclined at an angle θ with respect to the light exit surface or the other plate surface and the angle θ is smaller than 5 degrees.

2. The lighting device according to claim 1, wherein the thickness dimension of the light entering section at the extended end thereof is substantially equal to a thickness dimension of the light source row.

3. A display device comprising:
   the lighting device according to claim 1; and
   a display panel displaying images using light from the lighting device.

4. The lighting device according to claim 1, wherein the light source row is mounted on one light source board.

5. The lighting device according to claim 4, wherein
   the light entering surfaces of the light guide plates are on a same plane surface, and
   the light source board is fixed to all of the light guide plates at the light entering sections.

6. The lighting device according to claim 1, wherein
   each of the light guide plates includes the light entering sections at intervals in the arrangement direction of the light sources, and
   the light entering sections of the light guide plates are arranged such that the light entering sections of a same light guide plate are not arranged next to each other seen from the normal direction of the light exit surface.

7. The lighting device according to claim 6, wherein the light entering sections of the light guide plates are arranged such that a distance between the extended ends of the light entering sections that are adjacent to each other is from 0.2 mm to 2.0 mm seen from the normal direction of the light exit surface.

8. The lighting device according to claim 6, wherein
   the light exit section is divided into divided areas by an elongated structure that extends in a normal direction of the light entering surface, and
   at least one of the light entering sections extends from a portion of the first edge surface corresponding to each of the divided areas and the extended end surface thereof is the light entering surface through which light from the light source group enters.

9. The lighting device according to claim 1, wherein
   the light guide plates at least include a first light guide plate and a second light guide plate that is disposed on the other plate surface of the first light guide plate,
   the first light guide plate includes a first uneven pattern on at least one of the light exit surface and the other plate surface thereof, and the first uneven pattern allows the light that has entered through the light entering surface to exit through the light exit surface,
   the second light guide plate includes a second uneven pattern on at least one of the light exit surface and the other plate surface thereof, and the second uneven pattern allows the light that has entered through the light entering surface to exit through the light exit surface, and
   the first uneven pattern and the second uneven pattern are disposed not to overlap each other seen from the normal direction of the light exit surface.

10. The lighting device according to claim 9, wherein the second uneven pattern is relatively closer to the light entering section than the first uneven pattern is.

11. The lighting device according to claim 9, wherein the first light guide plate and the second light guide plate are formed in a same shape and are disposed in an inverted arrangement such that a plate surface of the first light guide plate corresponding to the light exit surface becomes the other plate surface of the second light guide plate.

12. The lighting device according to claim 9, further comprising another light source row that includes light sources arranged along another edge section that is opposite from one edge section along which the light sources are arranged, the other light source row and the light source row sandwiching the light guide plates therebetween, wherein
   each of the light guide plates includes another light entering section, and the other light entering section extends from a second edge surface of the peripheral edge surfaces of the light exit section toward the other light source row and includes an extended end surface thereof as a light entering surface through which the light from the other light source row enters, and the second edge surface is opposite from the first edge surface, and
   one of the first uneven pattern and the second uneven pattern includes first uneven patterns or second uneven patterns and one of the first uneven patterns or the second uneven patterns are disposed at intervals in a normal direction of the light entering surface.

\* \* \* \* \*